United States Patent
Voss-Wolff

(10) Patent No.: US 11,430,179 B2
(45) Date of Patent: Aug. 30, 2022

(54) DEPTH BUFFER DILATION FOR REMOTE RENDERING

(71) Applicant: MICROSOFT TECHNOLOGY LICENSING, LLC, Redmond, WA (US)

(72) Inventor: Christian Voss-Wolff, Baden-Württemberg (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 16/799,474

(22) Filed: Feb. 24, 2020

(65) Prior Publication Data
US 2021/0264661 A1    Aug. 26, 2021

(51) Int. Cl.
*G06T 15/40* (2011.01)
*G06F 3/01* (2006.01)
*G06T 15/00* (2011.01)

(52) U.S. Cl.
CPC ........... *G06T 15/405* (2013.01); *G06F 3/012* (2013.01); *G06T 15/005* (2013.01)

(58) Field of Classification Search
CPC ............... G06T 15/002; G06T 15/005; G06T 2207/10028; G06T 15/405; G06F 3/012; H04N 13/128; H04N 19/70; H04N 19/86; H04N 19/88; H04N 19/174; H04N 19/176; H04N 19/597; H04N 13/117; G02B 27/017; G02B 2027/014
See application file for complete search history.

(56) References Cited

U.S. PATENT DOCUMENTS

| | | |
|---|---|---|
| 7,206,000 B2 | 4/2007 | Zitnic et al. |
| 8,270,752 B2 | 9/2012 | Yea et al. |
| 8,649,592 B2 | 2/2014 | Nguyen et al. |

(Continued)

FOREIGN PATENT DOCUMENTS

| | | | |
|---|---|---|---|
| KR | 20190098003 | * | 8/2019 |
| WO | 2019185983 A1 | | 10/2019 |
| WO | 2019199531 A1 | | 10/2019 |

OTHER PUBLICATIONS

Andrew D. Wilson, Fast Lossless Depth Image Compression, ISS 2017 (Year: 2017).*

(Continued)

*Primary Examiner* — Phuc N Doan
(74) *Attorney, Agent, or Firm* — Workman Nydegger

(57) ABSTRACT

Techniques for improving remote rendering and reprojection are disclosed herein. A color image is generated, where this color image includes overlapping content regions. A depth buffer is generated for the color image and includes depth values for the pixels in the color image. The depth buffer includes both essential and non-essential depth discontinuities. While preserving the essential depth discontinuities, the non-essential depth discontinuities are eliminated from the depth buffer. New non-essential discontinuities are prevented from being included in the final version of the depth buffer. The color image is encoded into a color image video stream, and the modified depth buffer is encoded into a depth buffer stream. The color image video stream and the depth buffer stream are then transmitted to a remotely located HMD. The HMD then reprojects the color image based on the depth values in the depth buffer.

20 Claims, 17 Drawing Sheets

(56) References Cited

U.S. PATENT DOCUMENTS

| | | | |
|---|---|---|---|
| 10,198,621 B2 | 2/2019 | Takeda et al. | |
| 2012/0306876 A1* | 12/2012 | Shotton | G06T 7/251 |
| | | | 345/424 |
| 2013/0321590 A1* | 12/2013 | Kirk | H04N 13/246 |
| | | | 348/48 |
| 2018/0218485 A1* | 8/2018 | Xi | G06T 7/136 |
| 2019/0197739 A1 | 6/2019 | Sinharoy et al. | |
| 2019/0250406 A1* | 8/2019 | Nakamura | G03H 1/0244 |
| 2019/0279371 A1 | 9/2019 | Usikov et al. | |
| 2019/0313110 A1* | 10/2019 | Mammou | H04N 19/597 |
| 2019/0347803 A1 | 11/2019 | Lim et al. | |

OTHER PUBLICATIONS

"V-PCC Codec description", In MPEG meeting of Motion Picture Expert Group, Jan. 2019, 38 Pages.

"International Search Report and Written Opinion Issued in PCT Application No. PCT/US21/014412", dated May 20, 2021, 14 Pages. (MS# 408044-WO-PCT).

Daribo, et al., "Bilateral Depth-Discontinuity Filter for Novel View Synthesis", In Proceedings of the IEEE International Workshop on Multimedia Signal Processing (MMSP), Oct. 4, 2010, pp. 145-149.

Lee, et al., "Discontinuity-adaptive Depth Map Filtering for 3D View Generation", In the Proceedings of the Second International Conference on Immersive Telecommunications, Article No. 8, May 27, 2009, 6 Pages.

Lu, et al., "Foreground-Object-Protected Depth Map Smoothing for DIBR", In Proceedings of IEEE International Conference on Multimedia and Expo, Jul. 9, 2012, pp. 339-343.

Pourazar, et al., "A Comprehensive Framework for Evaluation of Stereo Correspondence Solutions in Immersive Augmented and Virtual Realities", In Journal of Virtual Reality and Broadcasting, vol. 13, Issue 2, Jan. 19, 2017, 24 Pages.

\* cited by examiner

DEPTH BUFFER DILATION FOR REMOTE RENDERING

BACKGROUND

Mixed-reality (MR) systems/devices include virtual-reality (VR) and augmented-reality (AR) systems. Conventional VR systems create completely immersive experiences by restricting users' views to only virtual images rendered in VR scenes/environments. Conventional AR systems create AR experiences by visually presenting virtual images that are placed in or that interact with the real world. As used herein, VR and AR systems are described and referenced interchangeably via use of the phrase "MR system." As also used herein, the terms "virtual image," "virtual content," "color image," and "hologram" refer to any type of digital image rendered by an MR system. Furthermore, it should be noted that a head-mounted device (HMD) typically provides the display used by the user to view and/or interact with holograms provided within an MR scene/environment.

An MR system's HMD typically includes a head tracking camera system having one or more head tracking camera(s) and an inertial measurement unit (IMU). Using these cameras, the head tracking system can determine the HMD's position and pose relative to its surrounding environment. Data from the IMU can be used to augment or supplement the camera data to provide a more reliable position and pose determination.

The HMD's position and pose are both relied upon by an MR system when visually placing/rendering holograms in an MR scene. For instance, using Simultaneous Location And Mapping (SLAM), the MR system's head tracking and IMU units can calculate and determine a user's position as the user moves through space and can provide immediate display corrections (i.e. reprojections) for the virtual content in the MR scene.

In some instances, remote rendering may be performed where a hologram is initially generated or prepared at a remote system (e.g., perhaps at a remote cloud service having a specialized graphics processing unit GPU) and then transmitted over a network to the HMD. This type of remote rendering is beneficial because it can help reduce the amount of processing performed locally on the HMD and thus may improve the HMD's battery life.

Often, however, there is a time lag or latency between when the remote service generates the image and when the HMD actually displays the image. For instance, if the remote service generates a hologram based on a determined or anticipated pose the HMD is predicted to be in, but then the HMD is not actually at the position for the pose when the hologram is to be displayed, then the HMD will need to perform some reprojections in order to correct the pose of the hologram to correspond to the HMD's current and true position.

Additionally, with traditional systems, the process of encoding and compressing the depth buffer often requires a substantial amount of computing resources. Indeed, one of the properties of video compression is that depth discontinuities (i.e. large changes in depth between neighboring depth values) are quite difficult to encode. For instance, video compression techniques typically rely on the encoded values being predictable relative to one another. If the neighboring values are highly disparate, disjointed, jumping, or discontinuous, it causes the encoding prediction process to expend additional resources to perform the encoding and compression processes. In essence, those highly disjoint locations contain more information that must be compressed.

Accordingly, notwithstanding the benefits that arise from using remote rendering, there exists many problems with remote rendering. One problem includes inefficiencies on the remote server-side concerning the compression and transmission of potentially highly detailed and computationally expensive color images or holograms and corresponding depth buffers that are transmitted over a network. Indeed, traditional systems consume large amounts of computing power to process discontinuities in depth buffers. Another problem includes inefficiencies on the HMD-side once the HMD receives the color images and depth buffers and needs to perform reprojections to correct those images' poses. It is, therefore, highly desirable to eliminate these inefficiencies to improve both the transmission and the reprojection processes.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein operate to solve the problems discussed earlier by improving the transmission efficiency of color images (i.e. holograms) between a remote rendering service and an HMD as well as by improving the reprojection efficiency of those color images once they are received by the HMD. By following the disclosed principles, substantial benefits, advantages, and computing efficiencies may be achieved, thereby improving the performance of the computing architecture and even improving the user's experience with the HMD.

In some embodiments, a color image is generated, where this color image includes a first content region, a second content region, and an overlap region where the second content region at least partially overlaps the first content region. Additionally, a depth buffer is generated for this color image. This depth buffer includes a depth value for each one of the pixels in the color image. The depth buffer is also structured or configured to identify or at least distinguish between a first set of depth values for the first content region, a second set of depth values for the second content region, and a third set of depth values for a non-content region included in the color image. An identification process is then performed, where this identification process involves identifying essential depth discontinuities and non-essential depth discontinuities in the depth buffer. As used herein, the "essential" depth discontinuities are depth discontinuities located within the depth buffer at areas corresponding to the overlap region of the color image. The "non-essential" depth discontinuities, on the other hand, are depth discontinuities located within the depth buffer at areas corresponding to borders between the non-content region and the first or second content regions. While preserving the essential depth discontinuities, the third set of depth values are then modified in the depth buffer to eliminate the non-essential depth discontinuities. New non-essential discontinuities are prevented from being included in the final version of the depth buffer. In some embodiments, the color image is then encoded into a color image video stream, and the modified buffer is encoded into a depth buffer stream. In some embodiments, the color image video stream and the depth buffer stream are then transmitted to a remotely located HMD. The embodiments then encode the modified depth buffer in a depth buffer stream to facilitate reduced bandwidth usage during the encoding process by reducing an amount of data (e.g., via elimination of the non-essential depth discontinuities) that is encoded and transmit said depth buffer stream to a remotely located device.

In some embodiments, an HMD is configured to receive, from a remote server device, a color image video stream and a depth buffer stream. The HMD then decodes the color image video stream to generate a color image and also decodes the depth buffer stream to generate a depth buffer. This depth buffer is a modified depth buffer that was previously modified to eliminate non-essential depth discontinuities while preserving essential depth discontinuities. Here, the "essential" depth discontinuities are depth discontinuities located at regions in the depth buffer corresponding to areas in the color image where a second hologram overlaps a first hologram. The "non-essential" depth discontinuities are depth discontinuities located at regions in the depth buffer corresponding to areas in the color image where either the first hologram or the second hologram borders a non-content far plane. For each color pixel in the color image, the HMD then determines a corresponding depth value included in the depth buffer. The HMD also determines its current position. Using the information detailing the HMD's current position in combination with the depth values included in the depth buffer, the HMD reprojects the color image to cause a perspective embodied by the color image to be modified to correspond to a true perspective that is determined based on the determined position of the HMD.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
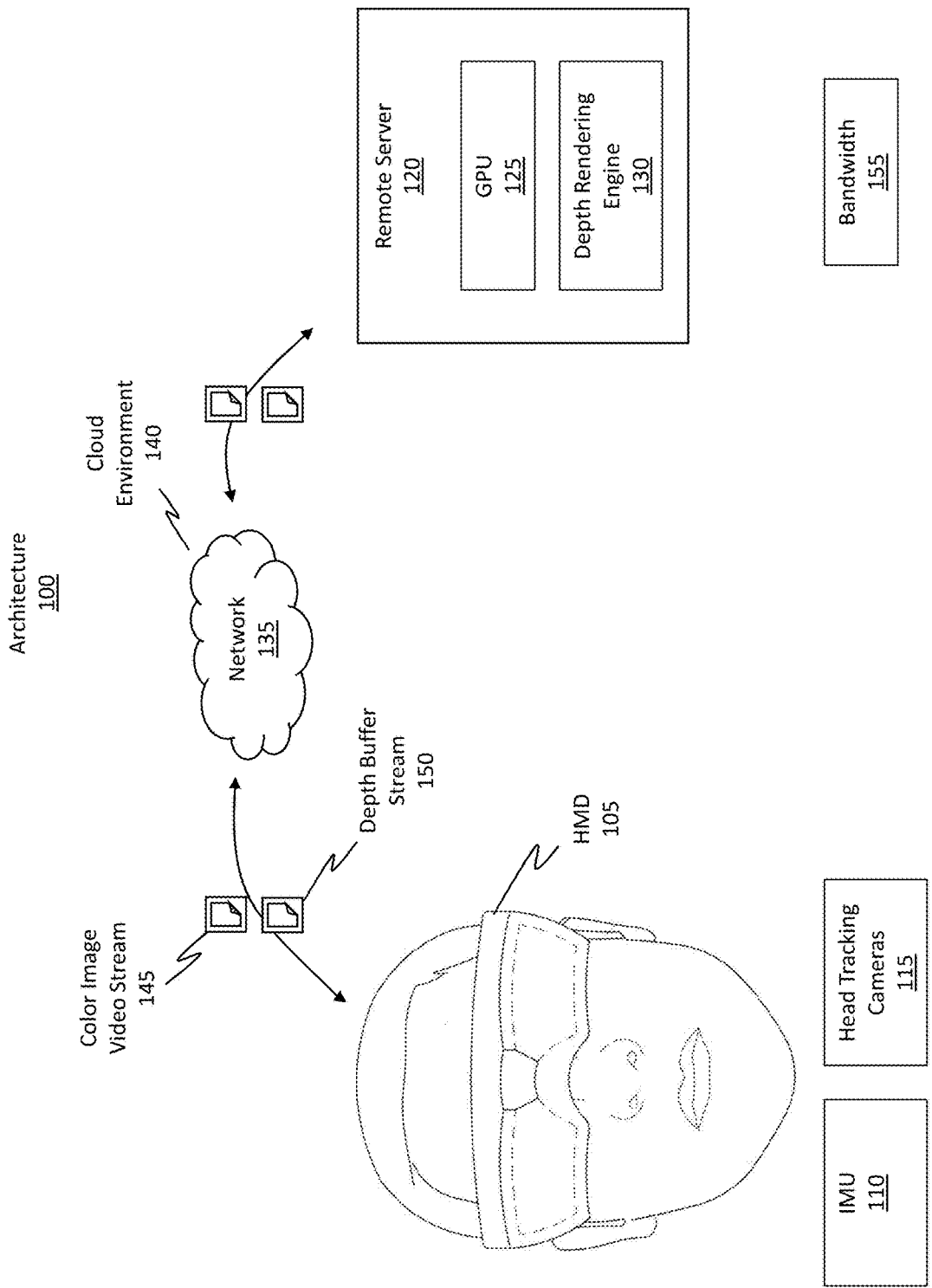
FIG. 1 illustrates an example architecture configured to perform remote rendering.

Embodiments disclosed herein improve the transmission efficiency of color images (i.e. holograms) between a remote rendering service and an HMD as well as improve the reprojection efficiency of those color images once they are received by the HMD.

In some embodiments, a color image is generated to include a first content region, a second content region, and an overlap region where the second content region at least partially overlaps the first content region. A depth buffer includes depth values for the pixels in the color image. The depth buffer also distinguishes between a first set of depth values for the first content region, a second set of depth values for the second content region, and a third set of depth values for a non-content region included in the color image. The embodiments then identify essential depth discontinuities and non-essential depth discontinuities in the depth buffer. "Essential" depth discontinuities are depth discontinuities located within the depth buffer at areas corresponding to the overlap region or regions (e.g., between holograms) of the color image. "Non-essential" depth discontinuities are depth discontinuities located within the depth buffer at areas corresponding to borders between the non-content region and the first or second content regions. While preserving the essential depth discontinuities, the third set of depth values are modified to eliminate the non-essential depth discontinuities while also ensuring that the final depth buffer has not been modified to include new non-essential depth discontinuities.

In some embodiments, an HMD receives a color image video stream and a depth buffer stream. The HMD decodes the color image video stream to generate a color image and decodes the depth buffer stream to generate a depth buffer. The depth buffer was previously modified to eliminate non-essential depth discontinuities while preserving essential depth discontinuities. In this context, "essential" depth discontinuities are depth discontinuities located at regions in the depth buffer corresponding to areas in the color image where a second hologram overlaps a first hologram. "Non-essential" depth discontinuities are depth discontinuities located at regions in the depth buffer corresponding to areas in the color image where either the first hologram or the second hologram borders a non-content far plane. For each color pixel in the color image, the HMD uses the depth buffer to determine a depth value. The HMD also determines its current position. Using the information detailing the HMD's current position in combination with the depth values, the HMD reprojects the color image to cause a perspective embodied by the color image to be modified to correspond to a true perspective that is determined based on the determined positioned of the HMD.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed principles bring about substantial benefits to the remote rendering and reprojection technical fields. For instance, the embodiments substantially improve the transmission of color images across a network and substantially improve how those color images are subsequently reprojected. As will be described in more detail to follow, the embodiments strategically select replacement depth values for any far plane depth values included in a depth buffer in order to provide maximum benefits as far as reducing compression costs and improving transmission efficiency.

As described earlier, with remote rendering, a service (perhaps operating in a cloud environment) transmits color images to a remote device (e.g., perhaps a remote HMD). The service often has a powerful GPU to produce the color image, which may be any type of image, including three-dimensional (3D) holograms. These color images are compressed or encoded into a video stream and then transmitted over a network to the remote HMD, which then decompresses or decodes the stream to generate the color image. Typically, when the service initially generates the image, the service generates the image to have a perspective corresponding to a specific pose the user of the HMD is anticipated or predicted to have. To clarify, the color image is generated to correspond to a specific position of the user (or rather, the HMD). By the time the color image arrives at the HMD from the cloud-based service, the original predicted position may no longer be accurate. As a consequence, the HMD performs a reprojection operation to modify the pose embodied by the color image to now reflect the actual or true pose of the HMD. This reprojection is performed by the HMD and may consume a significant amount of computing resources, thereby diverting resources from other applications executing on the HMD while also consuming battery life.

To perform this reprojection, the HMD needs to know the depth values for the pixels in the color image. Therefore, in addition to a color image being transmitted over the network, a depth buffer, which records or details depth values for every pixel in the color image, is also transmitted over the network. The HMD relies on the depth values in the depth buffer to perform the reprojection operation and to display the resulting color image. Notably, the depth buffer details or describes the depths at which each pixel is to be displayed from the HMD's rendered camera position. To be clear, the depths in the depth buffer are associated with display depths (e.g., how far the color image will appear from the user when the user views the color image); the depths in the depth buffer are not necessarily related to depths used for scene understanding. As a consequence, the cloud-based service generates the depths included in the depth buffer without necessarily requiring scene-based depth understanding. Accordingly, the depth buffer represents, for each pixel, the corresponding distance from the HMD's rendering camera position. The depth buffer is used on the client device/HMD for positional correction of the color image as well as, potentially, other purposes, such as focus information for light-field type displays.

As defined herein, a "depth discontinuity" refers to a large change (or a change satisfying a threshold change amount) between neighboring depth values in the depth buffer. By way of example, suppose a hologram is to be projected at a distance of 2 meters from the user while another hologram, which partially overlaps the first hologram, is to be projected 5 meters from the user. At the overlap location, there will be a large depth discontinuity because the depth values in the depth buffer will jump from values corresponding to 2 meters to values corresponding to 5 meters. Accordingly, discontinuities, which are regions where the distance of rendered geometry from the camera changes significantly between neighboring pixels, are challenging in the context of remote rendering because discontinuities are inherently more difficult to reproject (e.g., the amount of positional correction to be applied varies rapidly between neighboring pixels) and discontinuities imply a larger range of values, which require higher amounts of bandwidth to encode and transmit as a video stream to a client device.

One of the properties of video compression is that depth discontinuities are quite difficult to encode and require substantially more bandwidth to transmit to the HMD. For instance, video compression techniques typically rely on the encoded values being predictable relative to one another. If the neighboring values are highly disparate, disjointed, jumping, or discontinuous, it causes the encoding prediction process to expend additional resources to perform the encoding and compression processes. In essence, those highly disjoint locations contain more information that must be compressed. More information uses more bandwidth and thus consumes more network transmission resources. In accordance with the disclosed principles, the embodiments beneficially reduce the number of depth discontinuities included within a depth buffer. By reducing the number of depth discontinuities, the compression and encoding process while require less compute and less bandwidth will be required to transmit the depth buffer. As a consequence, the entire transmission process will be improved and made substantially more efficient, thereby improving the operational efficiency of the computing architecture, which includes the cloud-based service and the HMD.

Improvements and efficiencies are also realized on the HMD-side of the architecture. For instance, the subsequent reprojection operations, which are performed on the HMD, use the depth buffer information to determine the corrected pose for the color image. By reducing the number of depth discontinuities in the depth buffer, less complex information is transmitted to the HMD. As a consequence of receiving a less complex depth buffer, the HMD will use less computational resources to perform the reprojection process. To clarify, because there are fewer depth discontinuities between neighboring pixels in the color image, fewer computationally expensive positional corrections or reprojections will be performed and thus compute savings and battery savings may be realized. Accordingly, by performing the disclosed operations, significant benefits and advantages may be realized.

Example Architecture for Remote Rendering

Attention will now be directed to FIG. 1, which illustrates an example architecture 100 for performing remote rendering. As shown, architecture 100 includes a scenario involving a head-mounted device HMD 105. HMD 105 includes hardware for determining its current position relative to its environment. This hardware may include, but is not limited to, an inertial measurement unit IMU 110 and any number or type of head tracking cameras 115. Using the IMU 110 and the head tracking cameras 115, the HMD 105 is able to determine its pose relative to its environment. Determining this pose is beneficial for situations in which the HMD 105 is tasked with displaying holograms (i.e. color images) for a user to view and interact with. It is highly desirable for these holograms to be displayed at visually-pleasing locations. As such, accurately determining the position and pose of the HMD 105 is a beneficial operation.

As discussed earlier, HMD 105 is able to receive a hologram or color image that was initially prepared by a remote service or server, such as the remote server 120. Here, remote server 120 is shown as including a powerful graphics processing unit GPU 125 (and/or other types of processors) as well as a depth rendering engine 130. Together, the GPU 125 and the depth rendering engine 130 are able to generate color images and corresponding depth buffers. As described earlier, the color images are to be displayed at the HMD 105 at specific depths relative to the user, or rather, the rendering camera. The depth buffer is used to define the depths for each pixel in the color image.

With remote rendering, the remote server 120 communicates with the HMD 105 over a network 135. In some cases, the remote server 120 may be included as a part of a cloud environment 140 such that the remote server 120 is a cloud-based server (i.e. the computer system or remote server 120 is a server operating in the cloud environment 140).

In any event, the remote server 120 generates and prepares the color image and the depth buffer. The remote server 120 then compresses and encodes the color image into a color image video stream 145 for transmission over the network 135 to the HMD 105. Similarly, the remote server 120 compresses and encodes the depth buffer into a depth buffer stream 150 for transmission over the network 135. In this regard, two separate streams are transmitted to the HMD 105.

As described earlier, larger numbers of depth discontinuities in a depth buffer results in a larger amount of bandwidth 155 being consumed for both stream compression and encoding as well as transmission processes. As a consequence, it is highly desirable to intelligently reduce the number of depth discontinuities in the depth buffer while still preserving depth quality.

Figure 2A:
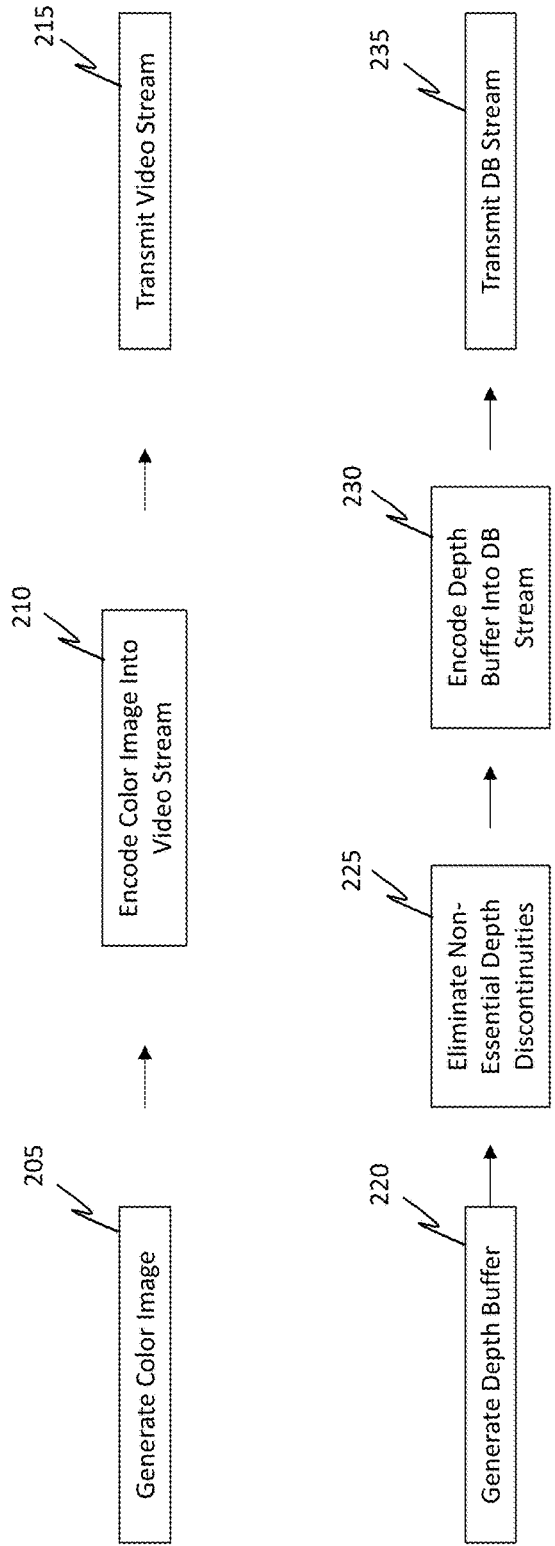
FIGS. 2A and 2B illustrate flow diagrams of an example technique for improving how remote rendering is performed.
Figure 2B:
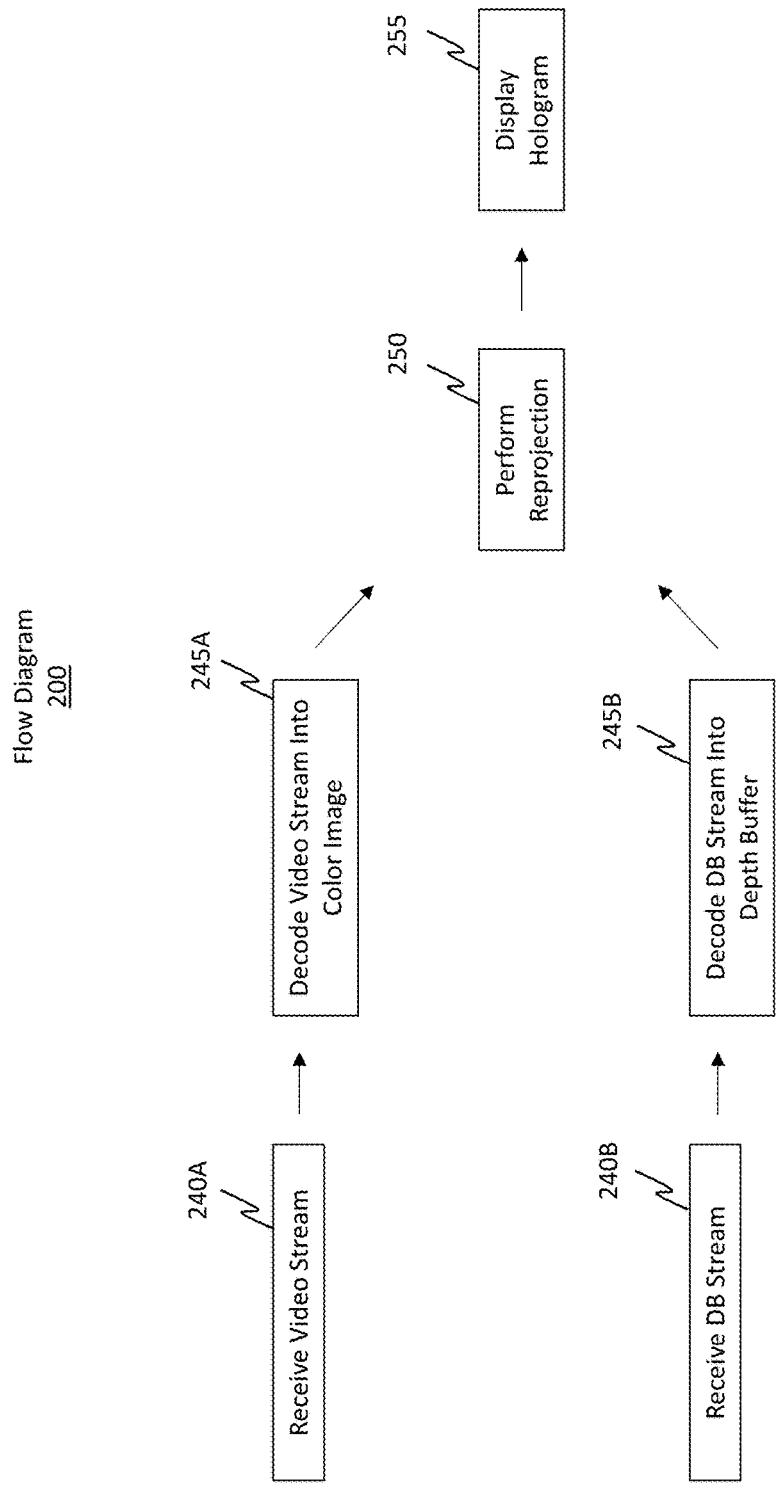

Before discussing the specifics regarding how the embodiments reduce the number of depth discontinuities in the depth buffer, attention will be directed to FIGS. 2A and 2B, which illustrate an example flow diagram 200 discussing the processes that may be performed by architecture 100 of FIG. 1. FIG. 2A illustrates some processes that are performed by the remote server 120 of FIG. 1 while FIG. 2B illustrates some processes that are performed by the HMD 105 of FIG. 1.

Initially, flow diagram 200 shows how the remote server generates a color image (act 205), encodes the color image into a video stream (act 210), and then transmits the video stream (act 215) to a remote HMD. In parallel with those operations, the remote server also generates a depth buffer (act 220). The remote server then beneficially eliminates so-called "non-essential" depth discontinuities from the depth buffer (act 225). The modified depth buffer is then encoded into a depth buffer DB stream (act 230), and the DB stream is then transmitted to the remote HMD (act 235).

FIG. 2B shows how the HMD receives the video stream (act 240A) and also receives the DB stream (act 240B). The HMD then decodes the video stream to produce the color image (act 245A) and also decodes the DB stream to produce the depth buffer (act 245B). After determining its current position and pose, the HMD uses the new pose information in conjunction with the depth buffer to reproject the color image or hologram (act 250) and then displays the hologram (act 255) for the user to view and interact with. Accordingly, FIGS. 2A and 2B provide an introduction regarding some of the operations performed by the disclosed embodiments.

Color Image and Depth Buffer Generation and Modification

Figure 3A:
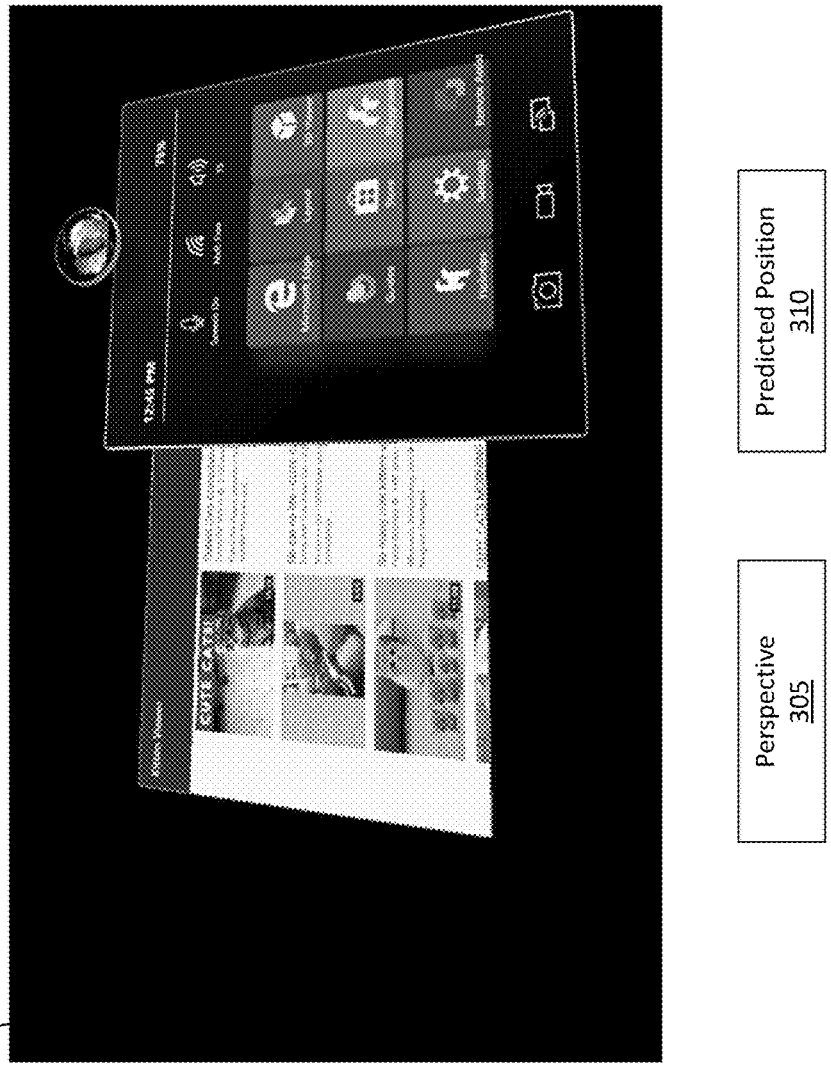
FIGS. 3A and 3B illustrate examples of color images that are to be transmitted from a server to a remote device for display.

With that understanding, attention will now be directed to FIG. 3A, which illustrates an example color image 300 that may be generated by the remote server 120 from FIG. 1 and which may be an example of the color image discussed in act 205 of FIG. 2A. The color image 300 is generated to have a particular perspective 305 (i.e. viewpoint relative to the user) based on a predicted position 310 or pose that the user or the HMD is anticipated or predicted will be in (e.g., when the color image 300 is received at the HMD).

Figure 3B:
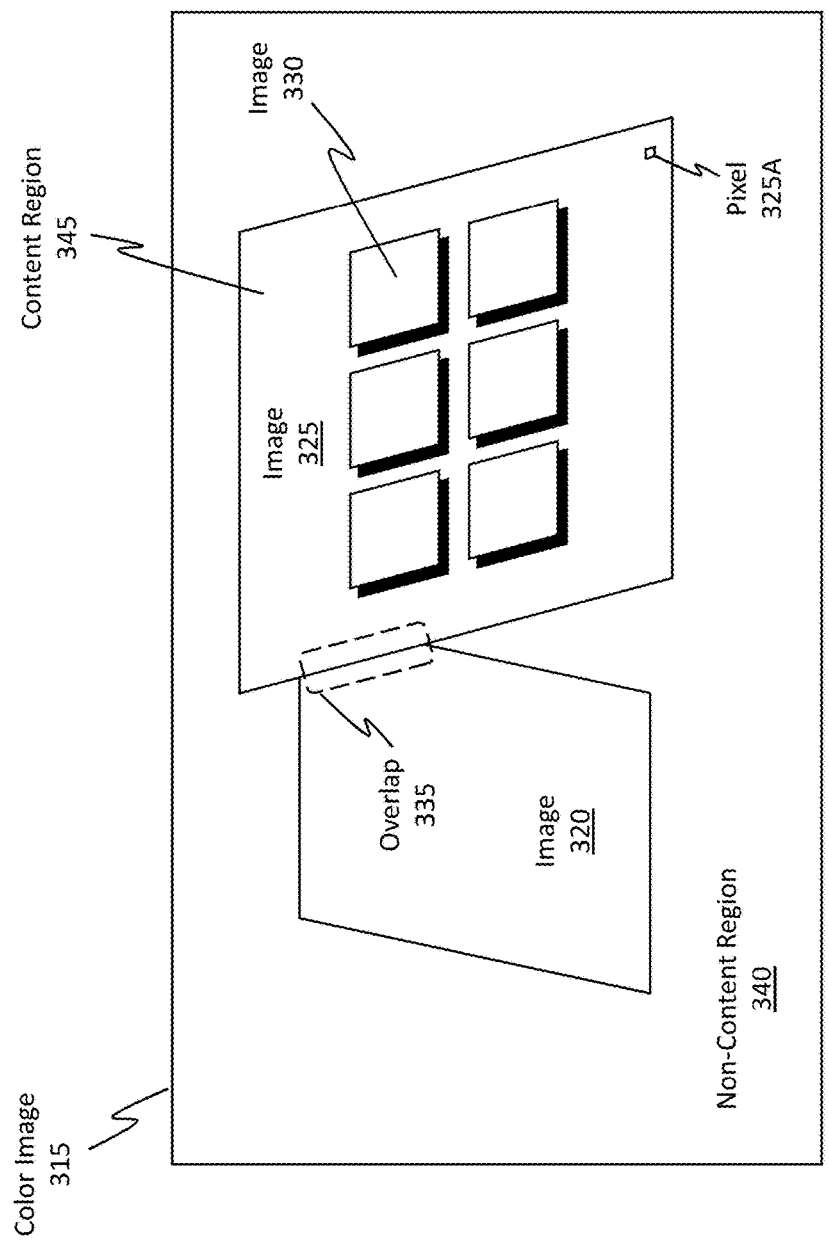

FIG. 3B illustrates an abstracted version of the color image 300 of FIG. 3A. In particular, FIG. 3B shows a color image 315, which is representative of the color image 300. Color image 315 includes different parts or components. For instance, color image 315 includes an image 320 (e.g., the "Cute Cats" image from FIG. 3A) and an image 325 (e.g., the dashboard from FIG. 3A). As shown, image 325 includes any number of pixels, such as pixel 325A. As described herein, a pixel is the smallest controllable or addressable element of an image.

Included within the image 325 are any number of additional sub-images, as shown by image 330 (e.g., each one of the tiles in the dashboard). In this particular example, the image 325 is currently partially overlapping (as shown by overlap 335) the image 320.

With this description, it will be appreciated that color image 315 includes both a non-content region 340 (i.e. areas in the color image 315 where there is no content, such as the black or dark areas in the color image 300 of FIG. 3A) and a content region 345 (i.e. areas in the color image 315 where there is content, such as the specific images shown in the color image 300). One will also appreciate how these are example illustrations only and should not be viewed as limiting.

Figure 4A:
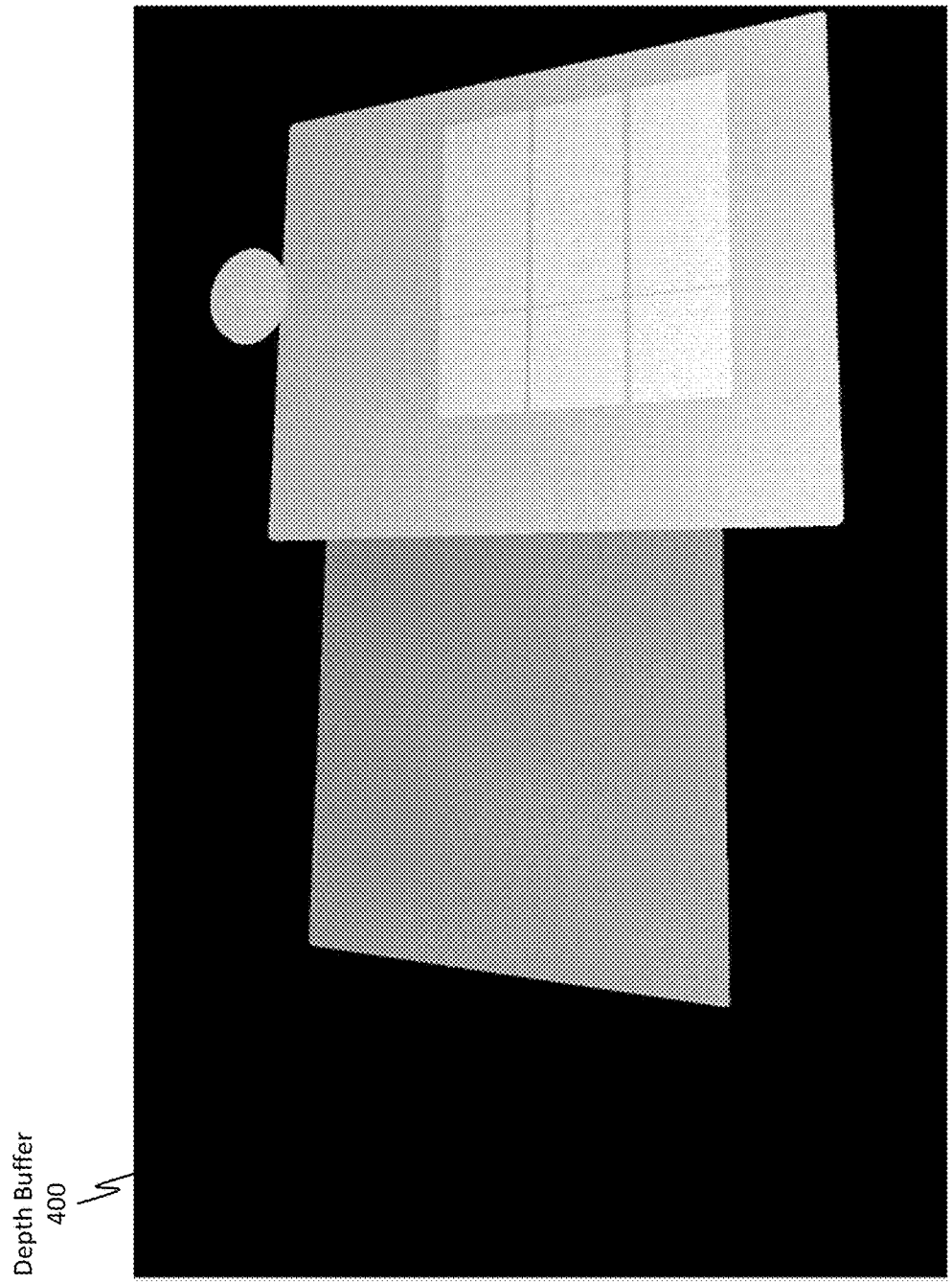
FIGS. 4A, 4B, and 4C illustrate various attributes of depth buffers that are used to define depth values for pixels included in color images and that include both essential depth discontinuities and non-essential depth discontinuities.

FIG. 4A shows an example depth buffer 400 that is created to reflect or to indicate the depth values for the color image 300 of FIG. 3A and color image 315 of FIG. 3B. Here, the different shades of gray and black reflect different depth values for the color images. The black area in the depth buffer 400 corresponds to a "far plane" of the color image. To clarify, the far plane corresponds to the non-content region 340 of FIG. 3B in that there is no image content in that area. As a consequence, the far plane may be assigned an arbitrary depth value to symbolically represent the lack of content in the color image.

Notice, the other areas in the depth buffer 400 are shown as having different grayscale values, meaning those different areas have different depths. Additional clarification is provided with respect to FIG. 4B.

Figure 4B:
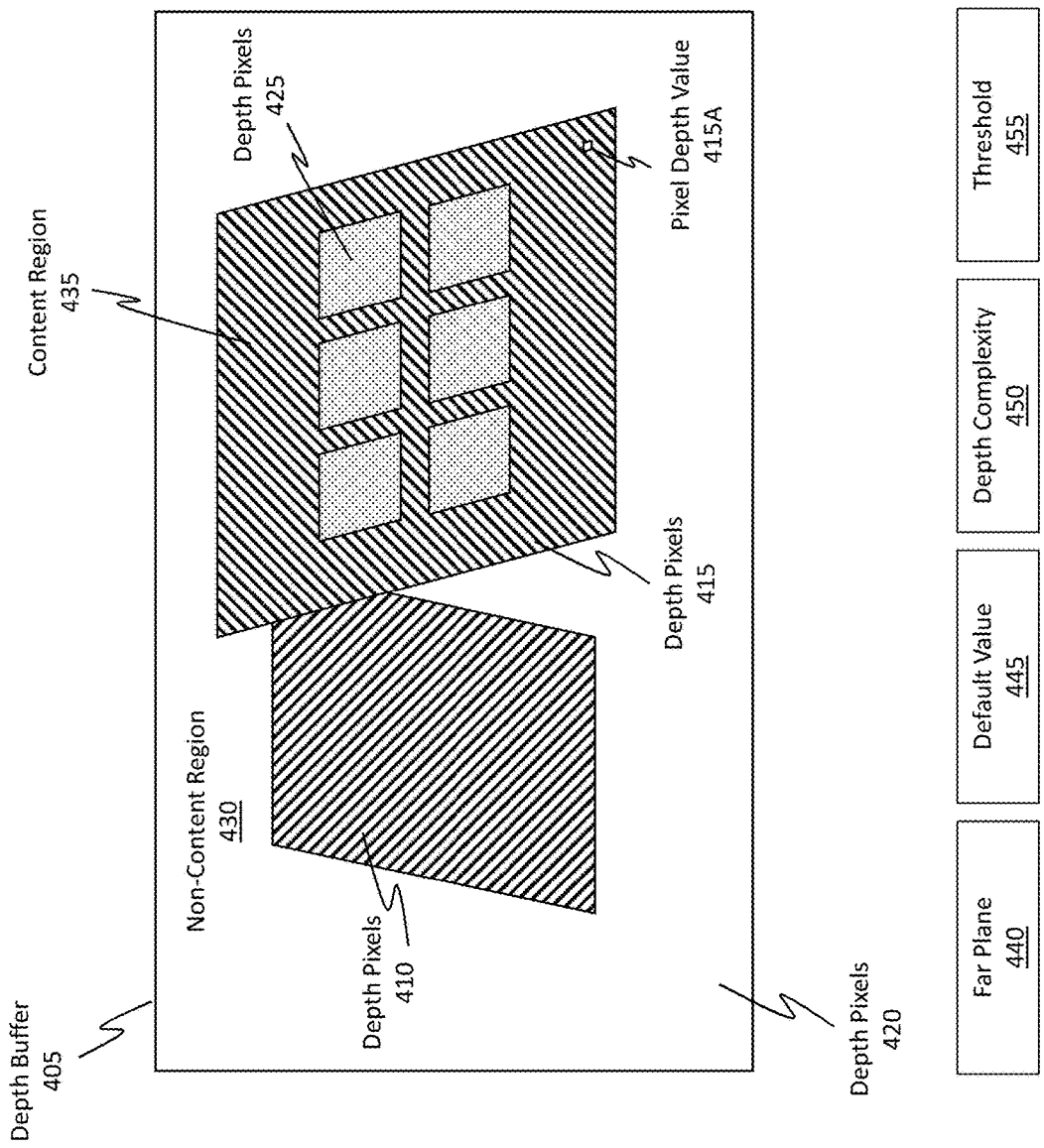

In particular, FIG. 4B shows a depth buffer 405, which is an abstracted version of the depth buffer 400 of FIG. 4A. Depth buffer 405 is shown as including depth pixels 410, or rather depth "values," corresponding to the image 320 from FIG. 3B. Similarly, depth buffer 405 includes depth pixels 415, which reflect the depth values for the image 325. Notably, the depth pixels 415 include any number of depth values for the pixels included in the corresponding color image or color image portion (e.g., image 325 from FIG. 3B). By way of example, pixel depth value 415A represents the depth value for the pixel 325A of FIG. 3B.

Depth pixels 420 reflect the arbitrary depth values of the far plane, or rather the non-content region 340. Depth pixels 425 reflect the depth values for the image 330. Based on these different depth pixels or depth values, the depth buffer 405 distinguishes between, or at least may be queried or examined in order to identify differences between, the non-content region 430, corresponding to non-content region 340, and the content region 435, corresponding to the content region 345.

Here, the non-content region 430 may be referred to as a so-called far plane 440. The far plane 440 (or the non-content region 430) may be assigned a maximum depth default value 445 that is supported by the format of the depth buffer 405. Depth values for the far plane 440 may be provided or set to any arbitrary value so long as the values are distinguishable from depth values for content regions.

In this example, the depth pixels 410 are assigned different depth values than any of the other depth pixels. Similarly, the depth pixels 415, 420, and 425 are all unique as compared to one another. Because of these discontinuous or disparate depth values, the depth buffer 405 has a relatively high depth complexity 450, which generally refers to a relative amount of discontinuities (introduced earlier) included within a depth buffer. For instance, color images having a high number of different content regions, where each content region has a different depth perspective, will cause a depth buffer to have a relatively higher depth complexity 450 because the depth buffer will include numerous depth discontinuities. In contrast, color images having a relatively lower number of different content regions will cause a relatively simpler depth buffer to be generated (i.e. a lower depth complexity 450). As will be described in more detail later, the embodiments are able to determine whether the depth complexity 450 has reached a threshold 455 complexity. If the threshold 455 is reached, then the embodiments may be triggered to perform operations to reduce the depth complexity 450 by selectively and intelligently eliminating one or more of the depth discontinuities.

Figure 4C:
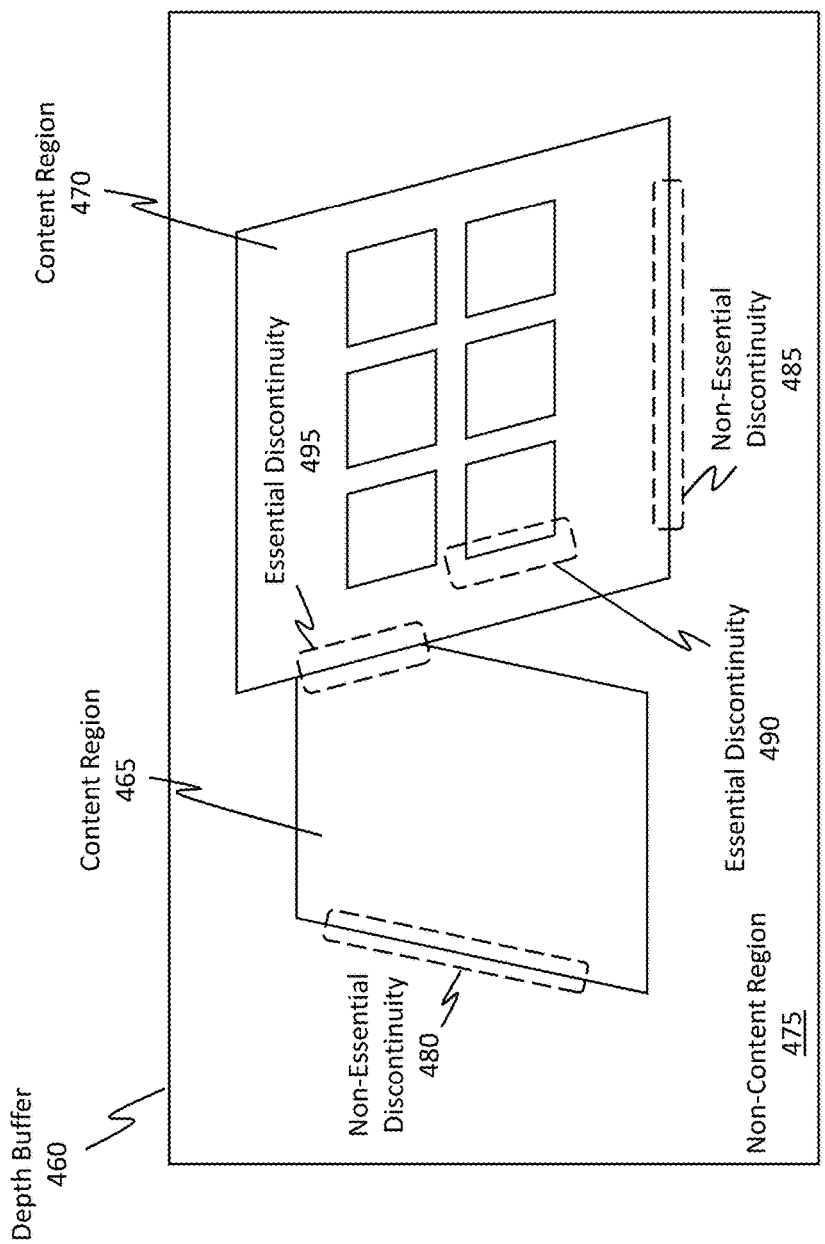

Notably, the embodiments are able to intelligently eliminate depth discontinuities by performing an initial classification to determine which discontinuities are essential and which discontinuities are non-essential. FIG. 4C provides a useful illustration.

FIG. 4C shows a depth buffer 460, which represents the depth buffer 405 from FIG. 4B and the depth buffer 400 from FIG. 4A. Depth buffer 460 is shown as including a content region 465, a content region 470, and a non-content region 475. Borders between non-content regions and content regions are referred to herein as "non-essential" discontinuities or non-essential depth discontinuities. For instance, the border between the content region 465 and the non-content region 475 is identified as being a non-essential discontinuity 480. Similarly, the border between the content region 470 and the non-content region 475 is identified as being a non-essential discontinuity 485.

On the other hand, areas where a content region overlaps another content region are identified as being "essential" discontinuities or essential depth discontinuities. For instance, the overlapping border between the content region 465 and the content region 470 is identified as being an essential discontinuity 495. Similarly, the content region 470 has another content region embedded therein. As a consequence, there is another essential discontinuity 490 at that border.

Accordingly, as recited herein, "essential" discontinuities are those depth discontinuities between different objects in the virtual world that overlap in view. "Non-essential" discontinuities, on the other hand, appear when an object borders a region where there is no content at all, which is by default represented in the depth buffer as a constant value, encoded as the farthest distance between the user and the rendering camera (i.e. the far plane). As those non-content regions have no visible content, it is possible to assign depth values for those pixels an arbitrary depth value without impacting the result that is displayed on the client device/HMD.

Notably, however, essential discontinuities should be preserved to maintain accurate depth perspective for the content regions. On the other hand, non-essential discontinuities actually do not contribute to the rendered depth perspective for the resulting color image. Indeed, non-essential discontinuities do not represent any actual property of the MR scene or the color image that is going to be shown to the user on the HMD.

As a consequence, the non-essential depth discontinuities can actually be removed without impacting perceived depth while also substantially improving the efficiency of the compression, encoding, transmission, and reprojection processes, as described earlier. Accordingly, the embodiments beneficially identify discontinuities, categorize these discontinuities as being non-essential or essential, and then effectively eliminate the non-essential discontinuities from the depth buffer in a manner so that no new non-essential discontinuities are formed in the final version of the depth buffer. Specific techniques for eliminating these non-essential discontinuities will be discussed later.

The essential discontinuity 495 of FIG. 4C represents or describes the depth values for the overlap 335 shown in FIG. 3B. Similarly, the essential discontinuity 490 represents or describes the depth values for the differences in depth between the image 330 and the image 325 in FIG. 3B.

Distinguishing Between Essential and Non-Essential Discontinuities

Figure 5:
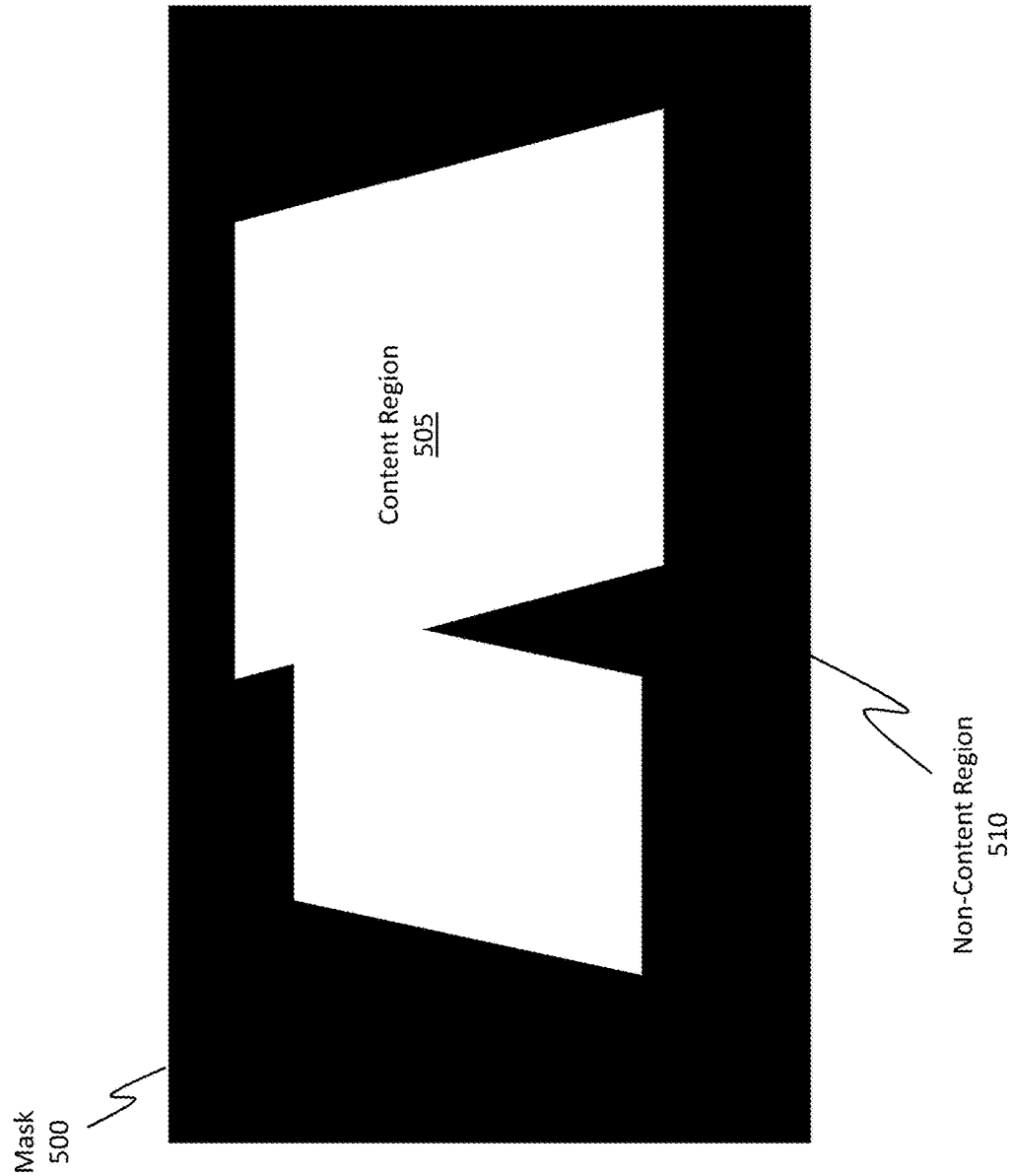
FIG. 5 illustrates an example of a mask that may be used to different between content regions and non-content regions in the color image.

Different techniques may be used to identify discontinuities, including both essential and non-essential discontinuities. FIG. 5 illustrates one such example technique.

For instance, some embodiments rely on the use of a mask 500 that separates a content region 505 from a non-content region 510 in the rendered color image. In particular, the mask 500 is produced that marks all pixels representing value content (which is to be displayed on the HMD) with a value (e.g., perhaps the value 1) and all non-valid content with a different value (e.g., perhaps the value 0). Non-valid content also includes all pixels with an associated depth value matching the far plane.

Accordingly, the mask 500 differentiates content from non-content regions based on (in some embodiments) the depth values, where content regions are identified as regions having depth values that are not equal to the far plane value while non-content regions are identified as regions having depth values that are equal to the far plane value. As will be described in more detail later, for non-masked regions (i.e. where the mask 500 is black), the embodiments reconstruct a depth value that specifically solves a particular mathematical equation (e.g., the Laplace equation) to satisfy certain criteria in order to achieve the objective of intelligently modifying these values to accomplish the efficiency goals listed earlier. Further details will be provided later.

Additionally, implementations may also declare pixels with a non-far plane depth value as non-content under special circumstances. In AR devices, this can be used when proxies for real-world objects are included in the virtual scene (i.e. environment mapping meshes). These are rendered into the color image as a fully transparent color while writing non-far plane values into the depth buffer. As these pixels become invisible on an AR display, rendering these proxies allows real world objects to occlude virtually rendered objects. The depth values produced by this approach are relevant for occlusion while producing the image, but potentially do not provide any value to the client device and can be regarded as non-content.

Based on mask 500, the embodiments are able to identify which depth discontinuities are specifically non-essential. For instance, essential depth discontinuities will be associated with only the content region 505 of the mask 500 while the non-essential depth discontinuities will be associated or will border the non-content region 510.

Another example technique for distinguishing between essential and non-essential discontinuities is by examining attributes of the color image to identify areas of overlap between content regions and border areas between non-content and content regions. Yet another example technique for distinguishing between essential and non-essential discontinuities is by examining the depth buffer itself.

For instance, the depth values in the depth buffer may be directly analyzed to determine whether the depth value is a far plane depth value. If it is, then that depth value corresponds to a non-content region. If the depth value is not a far plane depth value, then that depth value corresponds to a content region.

Neighboring pixels may be analyzed to identify disjoints, jumps, or discontinuities. If a discontinuity is identified as between a far plane depth value and some other depth value, then a non-essential discontinuity has been identified. On the other hand, if a discontinuity is identified between content depth values and other content depth values, then an essential discontinuity has been identified.

A threshold depth value "jump" or "disjoint" (i.e. the difference in depth between two depth values or two pixels) may be used to define whether or not that jump should be considered to be a discontinuity. For instance, within a set of depth values, if the depth values progressively increase or decrease in depth value, then that progressive change should likely not be considered to be a discontinuity. On the other hand, if the depth values suddenly change in value, then the border between the disparate values will likely be classified as a discontinuity. Any pre-determined threshold value may be used to determine whether or not the differences in depth between two pixels should constitute a discontinuity. Example values that may be used as the threshold include, but are not limited to, any value within the range spanning 0.001 meters (about 0.4 inches) and 50 meters. Of course, any other value or range may be used as well.

In some cases, attributes of the color image may also be analyzed to facilitate the discontinuity identification process. For instance, the metadata or visual attributes of the content regions in the color image may be analyzed to distinguish one hologram from another. By way of example, it may be the case that the color image has two separate holograms, which may partially overlap. In some cases, the two holograms may have only slightly different depths. As an example, suppose the color image is displaying pages in a book, where one page is slightly behind (depth-wise) the other page of the book. Here, these pages should be considered to be different holograms. To help distinguish these different holograms in the book (especially when the depth values are only slightly different), the embodiments may analyze the attributes of the holograms (e.g., the content within each hologram, such as visual appearance, color, texture, lighting, as so forth) to help identify essential discontinuities so those discontinuities are always preserved.

Another technique for distinguishing between different types of discontinuities it to examine an alpha value of the color image. This alpha value represents the opacity of the content in the color image. Alpha values having a value of 0 (i.e. fully transparent) represent non-content regions. Thus, the embodiments can identify areas where alpha values of 0 border non-zero alpha values to identify discontinuities.

Some embodiments operate to only identify non-essential discontinuities and refrain from actively identifying any essential discontinuities. Because only non-essential discontinuities will be removed from the depth buffer, it may be the case that it is not necessary to actively identify essential discontinuities. Accordingly, some embodiments do actively identify both essential and non-essential discontinuities while other embodiments actively identify only non-essential discontinuities.

Eliminating Non-Essential Depth Discontinuities

Once the non-essential depth discontinuities are identified, it is desirable to eliminate these non-essential discontinuities from the depth buffer. It is beneficial to not just eliminate these discontinuities in any arbitrary manner but rather to eliminate them in a manner so as to help facilitate or improve the efficiency of the subsequent encoding process. Additionally, it is desirable to eliminate the existing non-essential discontinuities while preventing new non-essential discontinuities from being included in the final version of the depth buffer. In this regard, the non-essential discontinuities are eliminated in a manner so that the later encoding process can be streamlined even further.

To achieve these benefits, the embodiments effectively eliminate the non-essential discontinuities in a manner so as to satisfy at least two properties or criteria. These two properties are as follows: (1) new depth values are selected for the far plane depth values so that the new depth values vary continuously as between content regions and the previous non-content regions in order to remove non-essential discontinuities (i.e. all far plane depth values are replaced by non-far plane values); and (2) the new depth values assigned to non-content pixels are selected to be maximally smooth to avoid introducing new discontinuities.

To eliminate the non-essential depth discontinuities, the depth buffer is modified to include modified depth values for areas that previously corresponded to non-content far plane regions. Recall, non-content regions were previously assigned a far plane depth value. The border or the intersection between far plane depth values and depth values for content regions produced the non-essential discontinuity.

To eliminate the non-essential discontinuities, therefore, the embodiments modify the depth values for the non-content regions so that discontinuities no longer exist in the depth buffer. Such modifications will not impact the perspective or depth resolution of the displayed color image because only the content pixels (whose depth values will not be modified) will be displayed while the non-content pixels (whose depth values will be modified) will not be displayed. Therefore, even if a non-far plane depth value is assigned to a non-content pixel, this depth value will have no impact on the color image because nothing will actually be displayed for that pixel. Substantial benefits will be achieved by assigning non-far plane depth values to those non-content regions because the non-essential discontinuities will be eliminated, thereby improving the efficiency for both the encoding and reprojection processes.

Figure 6A:
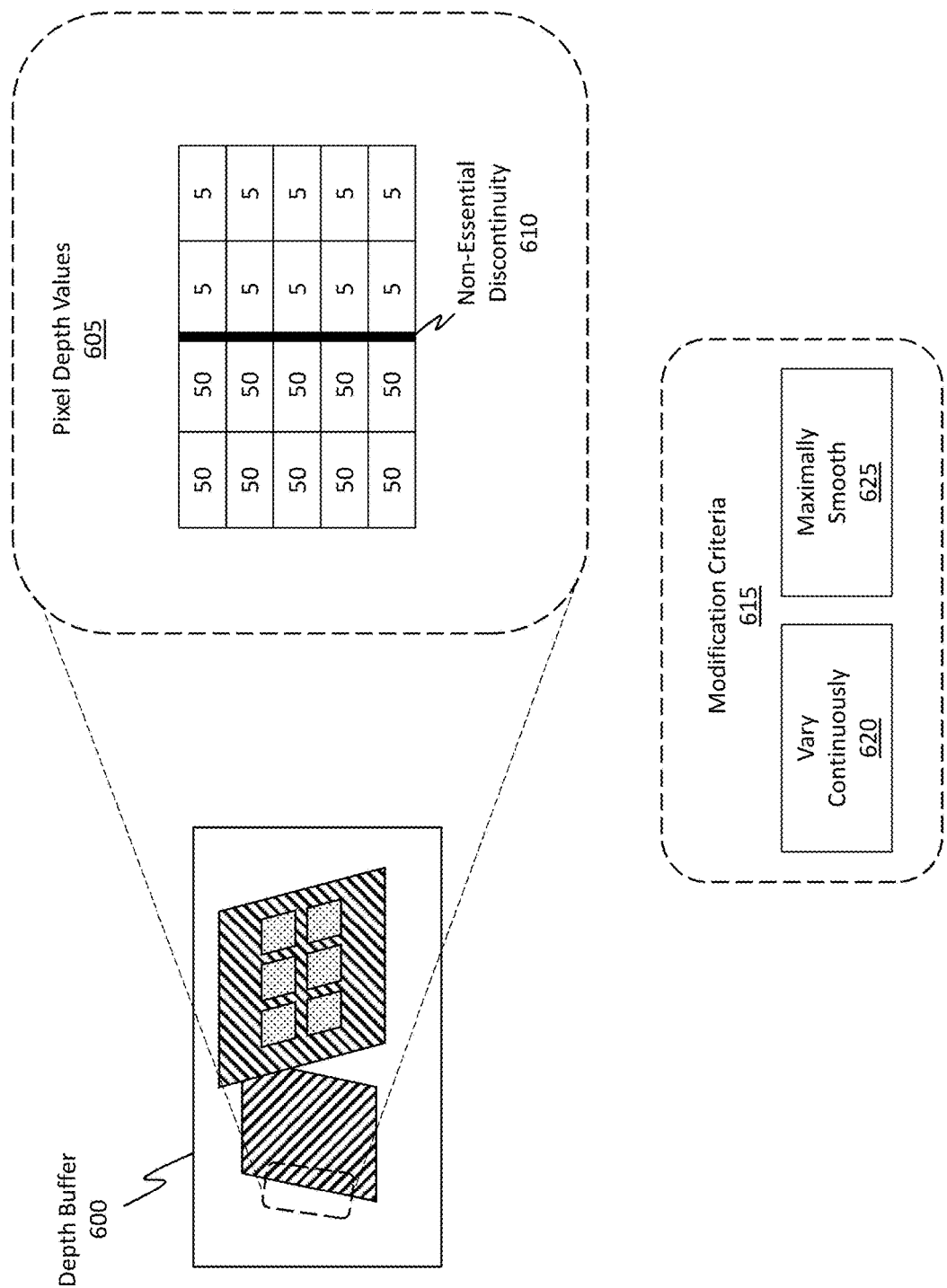
FIGS. 6A, 6B, and 6C illustrate an example depth value modification process used to selectively and intelligently modify depth values of the depth buffer in order to improve a subsequent encoding process performed by the server as well as a subsequent decoding and reprojection process performed by a remote head-mounted device (HMD) or other type of remote device capable of displaying content.
Figure 6B:
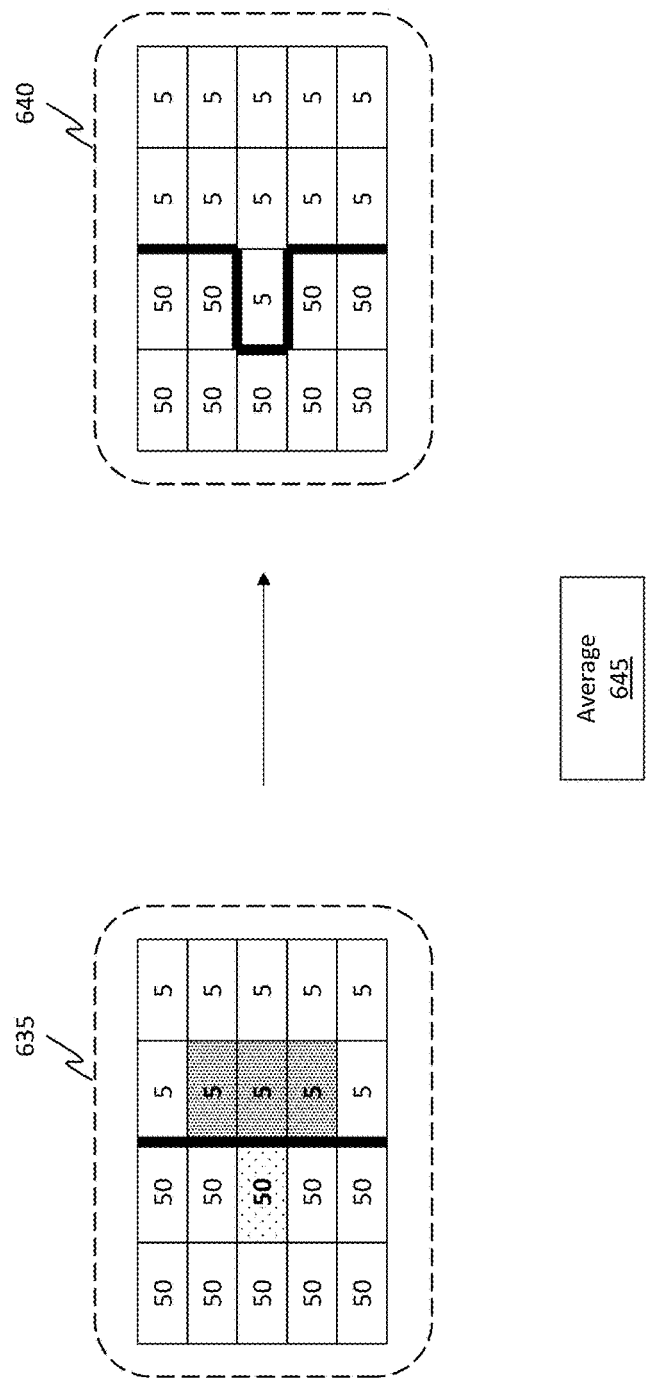
Figure 6C:
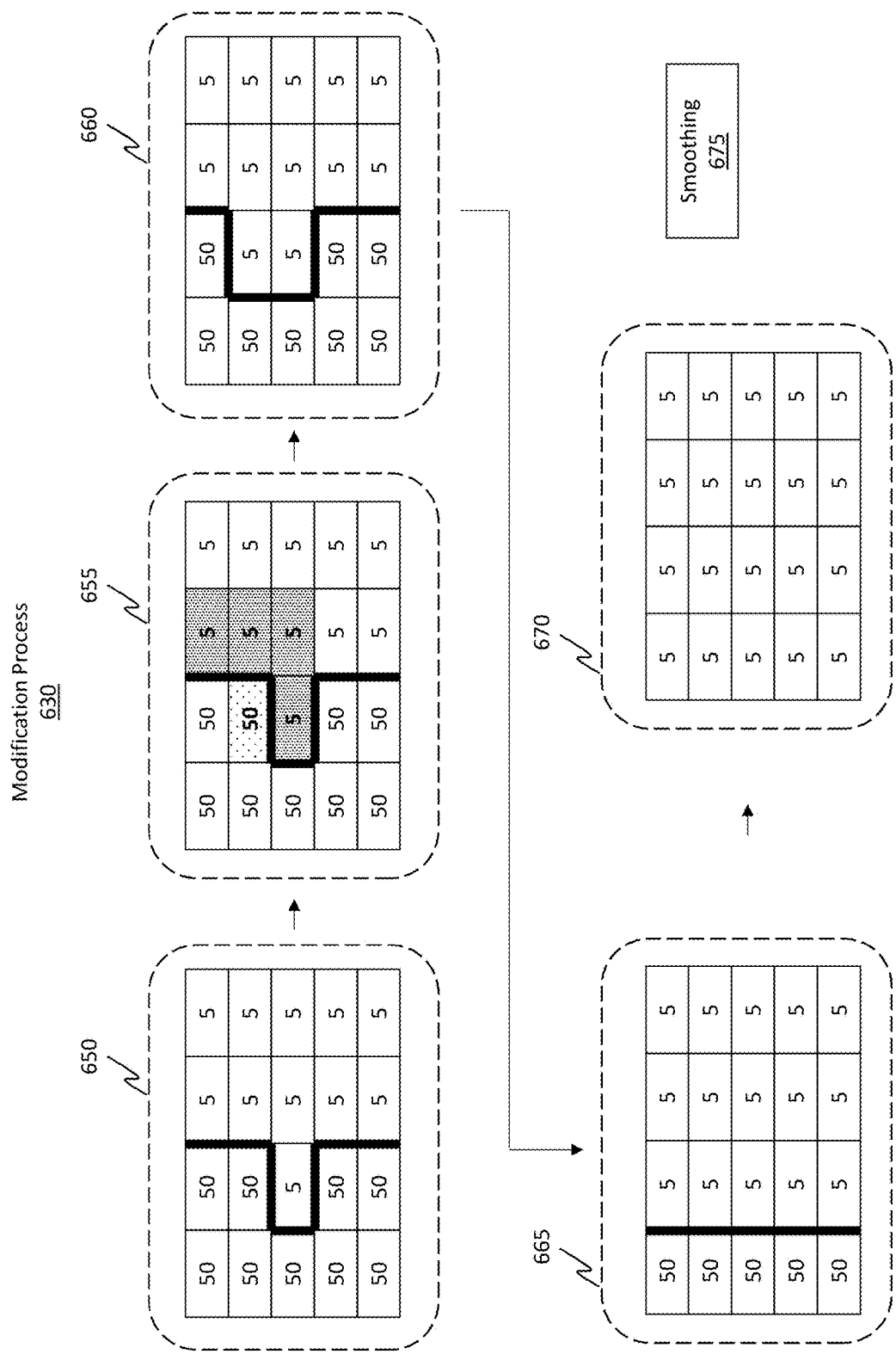

FIGS. 6A, 6B, and 6C illustrate an example technique for modifying the values in a depth buffer to eliminate far plane depth values and to thereby eliminate non-essential depth discontinuities. FIG. 6A illustrates an example depth buffer 600, which is representative of the depth buffers discussed thus far.

Here, depth buffer 600 is shown as including pixel depth values 605 as well as a non-essential discontinuity 610. For instance, the non-essential discontinuity 610 is formed because the pixel depth values 605 transition from a value of 5 (corresponding to a content region) to a value of 50 (corresponding to a non-content region, or the far plane). Of course, these are example depth values only and should not be viewed as being limiting.

As described above, the embodiments modify the far plane depth values in a manner to satisfy certain modification criteria 615, which includes a vary continuously 620 requirement/criterion as well as a maximally smooth 625 requirement/criterion. FIG. 6B provides further detail on an example implementation of this modification process.

FIG. 6B shows a modification process 630 in which a set of pixels 635, comprising the non-essential discontinuity from FIG. 6A, is modified. Initially, a far plane depth value is selected, where this far plane depth value is adjacent or immediately borders a content region. Here, the dotted "50" depth value has been selected because it is immediately adjacent to the highlighted depth values of "5," which are content depth values or depth values representing content regions.

In some implementations, the embodiments compute the average 645 of the content region depth values bordering the selected far plane depth value. For instance, the depth values of the three highlighted content region depth values (in this case, they all have the same value of 5) are averaged together and then the average 645 is assigned to the selected far plane depth value. For instance, the far plane depth value previously had the value of 50, but as shown by the set of pixels 640, the selected far plane depth value is modified to now take on the average 645 value (in this case "5"). As a consequence, the non-essential discontinuity (represented by the bolded line) has now shifted outward (relative to the content depth values) one pixel depth value.

The modification process 630 continues in FIG. 6C. In particular, the set of pixels 650 corresponds to the set of pixels 640 from FIG. 6B. Another far plane depth value is then selected, where this far plane depth value also abuts or is adjacent to the content depth values. For instance, the set of pixels 655 shows how another far plane depth value (i.e. the dotted "50" value far plane depth value) has been selected.

Similar to the previous process, the embodiments modify this far plane's depth value by computing the average of the adjacent content depth values (which may now also potentially include the previously modified far plane depth value) and then assigning that average value to the far plane's depth value, as shown by the set of pixels 660. Again, the non-essential discontinuity has been expanded outward.

In some implementations, the entire perimeter or border between non-content and content regions (i.e. all the locations where a non-essential discontinuity is present) may be progressively modified in this manner. The set of pixels 665 shows how all of the far plane depth values that previously abutted content depth values have been modified in the manner described above, thereby effectively expanding or shifting the non-essential discontinuity outward (relative to the content depth values) one pixel at a time. This process may be repeated until no more far plane depth values (and no more non-essential discontinuities) are included in the depth buffer, as shown by the set of pixels 670. As will be discussed in more detail later, the above-described average computation is referred to as a smoothing 675 operation and causes the resulting depth values to satisfy the maximally smooth 625 requirement in FIG. 6A. Furthermore, by modifying the depth values using the average, the resulting depth values will also vary continuously one from another, thereby satisfying the vary continuously 620 requirement. Additional details on these criteria will be described later.

Figure 7A:
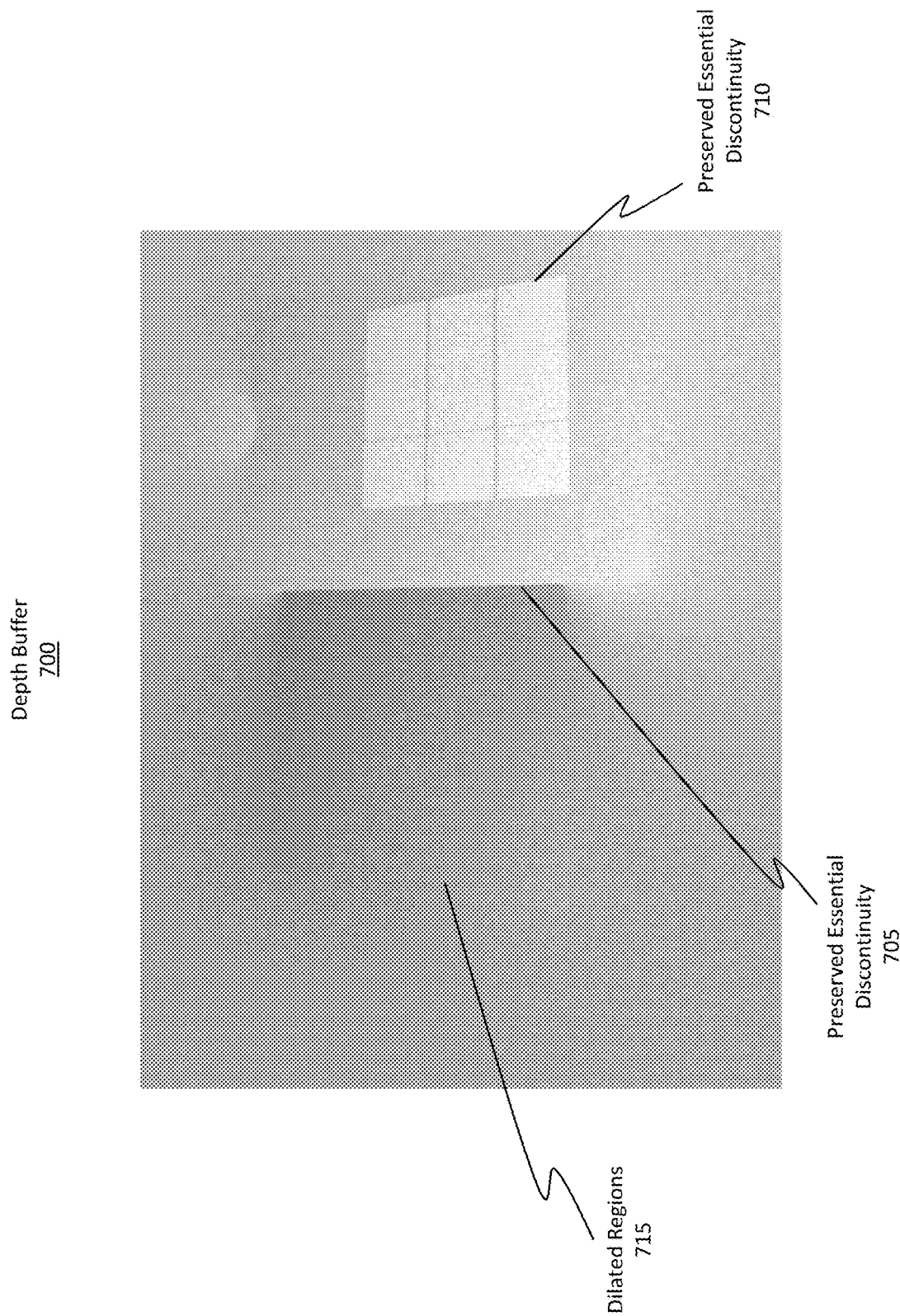
FIGS. 7A and 7B illustrate examples of depth buffers that have been modified to remove or eliminate non-essential depth continuities while preserving essential depth discontinuities and while also preventing new non-essential depth discontinuities from being included in the final version of the modified depth buffer.

In effect, the embodiments eliminate, dilate, or dilute non-essential discontinuities by assigning new depth values for existing far plane depth values (i.e. depth values that correspond to non-content regions in the color image). FIG. 7A shows a resulting depth buffer that is produced as a result of performing the above operations. In effect, the white portions of the mask 500 from FIG. 5 effectively grow outward to overtake the black portions, potentially one pixel depth value at a time. Similarly, the grayscale portions of the depth buffer 400 from FIG. 4A effectively grow outward to overtake the black portions.

In particular, FIG. 7A shows a modified depth buffer 700, which is a modified form of the depth buffer 400 from FIG. 4A. Whereas depth buffer 400 previously included black far plane depth values, the depth buffer 700 does not include any black far plane depth values. Notice, the previous operations preserved the essential discontinuities, as shown by preserved essential discontinuities 705 and 710, but the previous far plane depth values and the non-essential discontinuities have been eliminated and replaced by the dilated regions 715. The dilated regions 715, as shown, are now continuous with the previous content regions and the depth values are also maximally smooth.

Figure 7B:
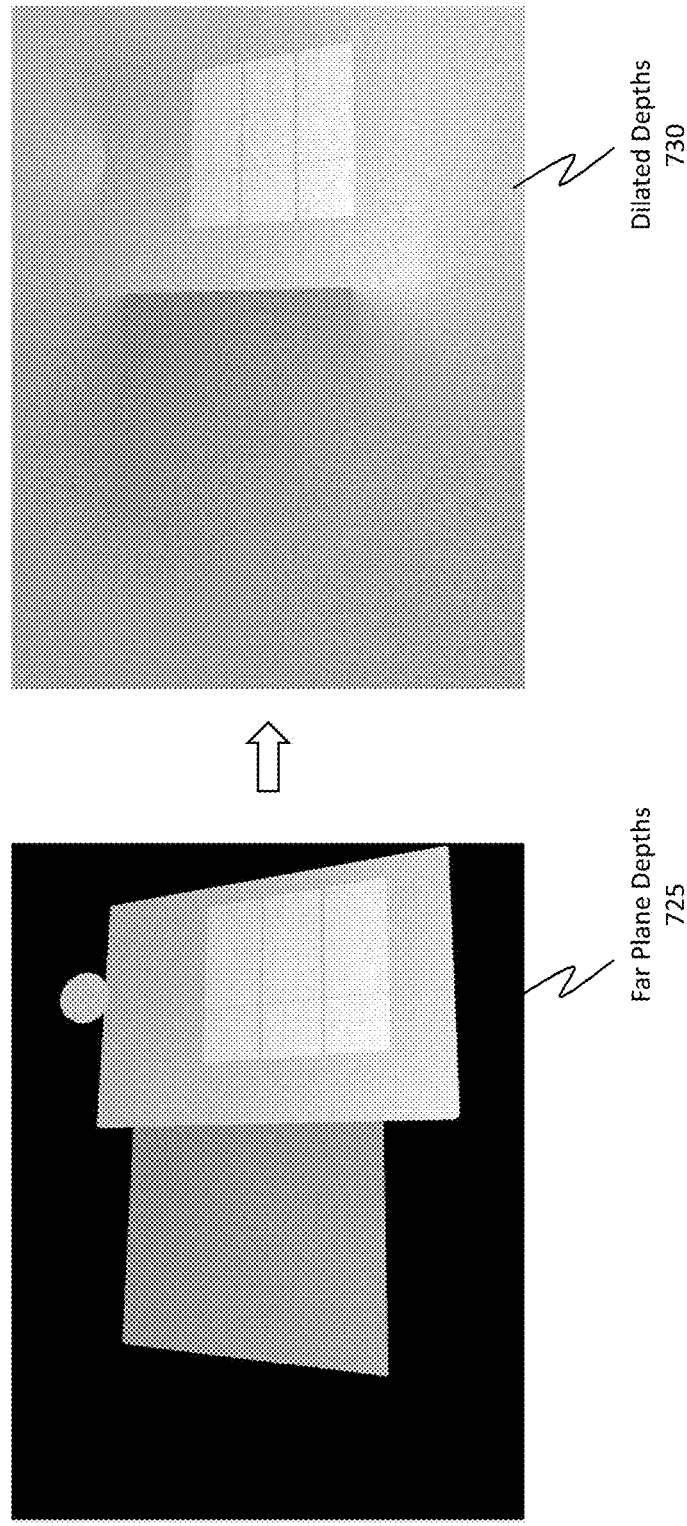

FIG. 7B provides a side-by-side comparison of the different depth buffers. Specifically, FIG. 7B shows a depth buffer comparison 720 in which the depth buffer 400 from FIG. 4A is visually compared against the depth buffer 700 of FIG. 7A. As a result of performing the depth value expansion/dilation processed described earlier, the far plane depths 725 have been replaced by the dilated depths 730, thereby eliminating all non-essential discontinuities. Accordingly, existing non-essential discontinuities are eliminated while the formation of new non-essential discontinuities is prevented from occurring or from being included in the final form of the depth buffer. It should be noted that during the dilation process, new non-essential discontinuities may potentially be formed (e.g., the set of pixels 660 in FIG. 6C shows how the non-essential discontinuity has shifted and may be considered as a "new" discontinuity), but the final version of the depth buffer is ensured to not have any non-essential discontinuities. A verification check may be performed on the depth buffer to verify no non-essential discontinuities are present before transmitting the depth buffer to the remote HMD. In some embodiments, the dilation process may be performed multiple times in the event new non-essential discontinuities are formed.

In some embodiments, the mask 500 from FIG. 5 is also involved in the depth value dilation or expansion operation. For instance, based on the mask 500, each non-content pixel in the depth buffer (i.e. the far plane depth values) may be modified to satisfy the modification criteria 615. In this regard, the mask 500 is primarily used to distinguish which depth values are to be modified (e.g., depth values corresponding to the black areas in the mask 500 are to be modified while depth values corresponding to the white areas in mask 500 are not to be modified). As more far plane depth values are modified (thereby effectively expanding the white areas of the mask 500 into the black areas of the mask 500), the mask 500 can be recomputed to reflect the modifications. The mask 500 may be recomputed after a single depth value is modified or even after a group or batch of depth values are modified (i.e. periodic modification).

In some embodiments, the mask 500 can be used in practice in an efficient implementation using a so-called "multigrid solver," which is described in more detail later. Mathematically, modifying the depth values to satisfy the modification criteria 615 from FIG. 6A can be represented as solving Laplace's equation for the non-content depth value "d," as indicated below. Using the Dirichlet Boundary Condition, "d" is to match the original depth value at content pixels (e.g., "d" may be modified to be the average depth values of the selected far plane depth value's neighboring content depth values). The differences between the values may, therefore, be set to 0, as shown below.

$\Delta d = 0$

Accordingly, the depth buffer 700 from FIG. 7A is the result of dilating depth into non-content regions. Note, depth buffer values are unmodified in regions that were masked out in the content region 505 of FIG. 500 such that the essential discontinuities illustrated throughout the figures are still present but the non-essential discontinuities have been eliminated and such that depth values for content regions were unmodified as well. Only depth values for non-content regions have been modified.

The above described modification process, which is also referred to herein as "depth dilation," is a technique to smoothly extend the depth of opaque objects into neighboring image regions where the depth value sits at the far plane. Depth dilation improves video encoding and reprojection quality in two ways: (1) depth discontinuities between objects and the far plane are removed, lessening the effect of under sampling at the edges; and (2) transparent objects without depth are reprojected with depth of nearby opaque objects, giving them a plausible depth estimate. This is relevant even if depth is reconstructed via optical flow, as optical flow may not cover all pixels. Additionally, dilation may also remove spurious depth values which should not contribute to reprojection by treating fully transparent black areas (r=g=b=a=0) the same as far plane areas.

The "Laplacian smoothing" mentioned above iteratively solves depth such that $\Delta d=0$ (i.e. each depth value is the average of its neighbors) at holes, jumps, or discontinuities while leaving some original depths (i.e. the depths for content regions) unmodified, resulting in both smooth and continuous depths at the previous (but now nonexistent) boundary.

An efficient Laplacian smoothing implementation can be done with a multigrid solver, which involve a "mipmap chain." The solver generally has 4 steps. The first step involves generating a mask and setting pixels at the far plane and fully transparent black pixels to a value of 0 while setting valid depth samples to a value of 1.

Another step involves downscaling the mask and the depth buffer until reaching the lowest mip level. For the depth, the mask is used as downscaling weights so that invalid depth samples do not contribute to the average.

After reaching the lowest level, another step involves upscaling by injecting the depth value from the higher mip where the mask >=0.5 and using the value from the lower mip where the mask <0.5. Then, at each level, another step involves running one or more Gauss-Seidel iterations to replace depth values where the mask <0.5 with the average of their neighbors. This upscaling process may be repeated and solved until reaching full resolution.

Example Methods for Reducing Depth Discontinuities in a Depth Buffer

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
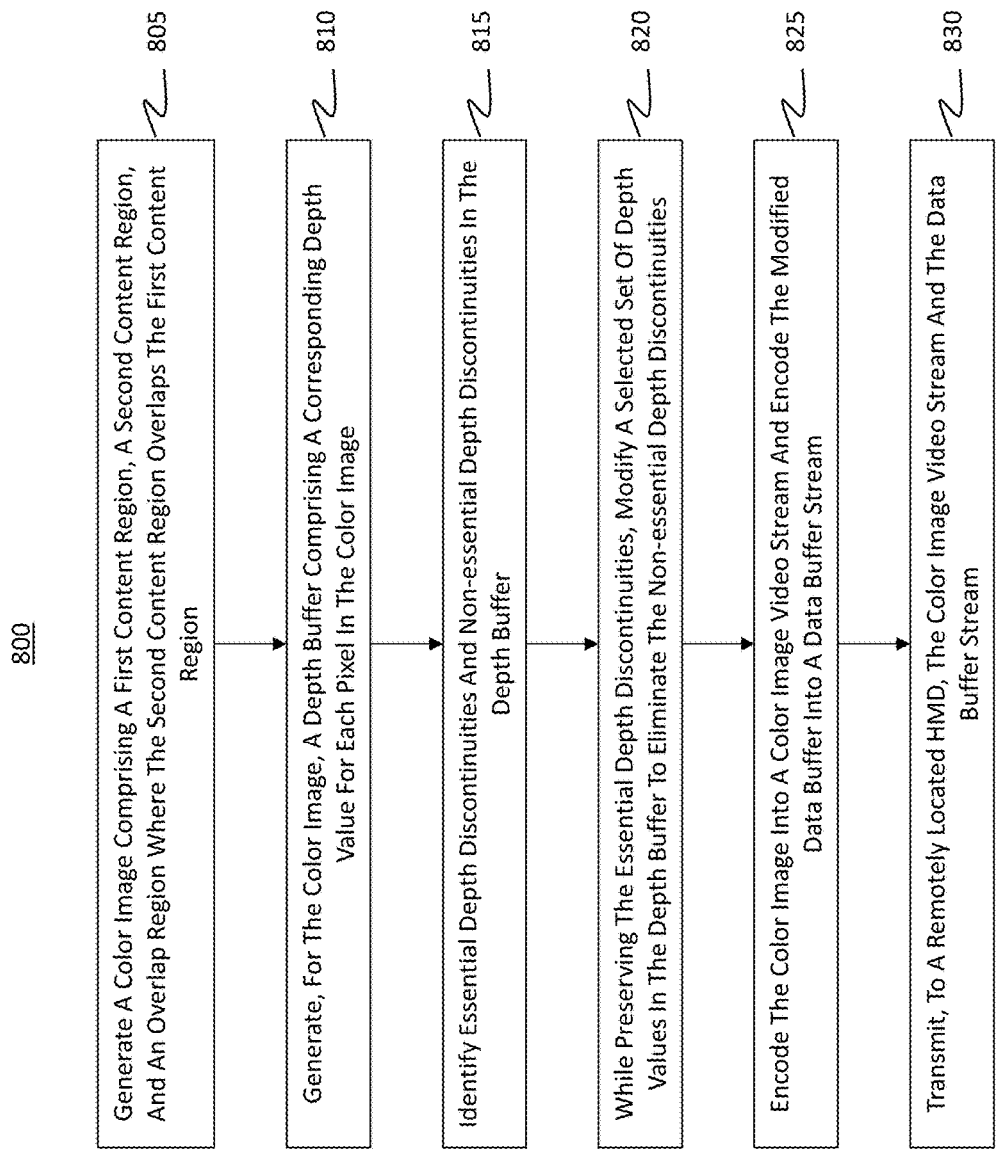
FIG. 8 illustrates a flowchart of an example method in which a server or service selectively and intelligently modifies areas or depth values in the depth buffer to eliminate so-called "non-essential" depth discontinuities while preserving so-called "essential" depth discontinuities.

Attention will now be directed to FIG. 8, which illustrates an example method 800 for dynamically modifying a depth buffer to eliminate non-essential depth discontinuities in order to use less or reduced bandwidth for compressing and encoding the depth buffer. Initially, method 800 includes an act (act 805) of generating a color image comprising a first content region (e.g., image 320 in FIG. 3B), a second content regions (e.g., image 325), and an overlap region (e.g., overlap 335) where the second content region overlaps the first content region. As illustrated in FIG. 3B, a single color image may have multiple instances or occurrences where holograms overlap one with another, thereby producing both essential discontinuities and non-essential discontinuities. It is advantageous to reduce the number of discontinuities in the depth buffer by eliminating the ones classified as being non-essential.

Method 800 also includes an act (act 810) of generating (e.g., for the color image) a depth buffer (e.g., depth buffer 405 from FIG. 4B). This depth buffer comprises a corresponding depth value (e.g., pixel depth value 415A in FIG. 4B) for each pixel in the color image (e.g., pixel 325A in FIG. 3B). In some cases, act 810 and act 805 may be performed in parallel with one another while in other cases the depth buffer may be generated (or perhaps later modified or refined) subsequent in time to the generation of the color image.

The depth buffer beneficially identifies a number of features corresponding to the color image. For instance, the depth buffer identifies a first set of depth values for the first content region. By way of example, the depth pixels 410 in FIG. 4B may correspond to the first set and are representative of the depths for the image 320 in FIG. 3B.

The depth buffer also identifies a second set of depth values for the second content region. To illustrate, the depth pixels 415 in FIG. 4B may correspond to the second set and are representative of the depths for the image 325 in FIG. 3B.

The depth buffer further identifies a third set of depth values for a non-content region included in the color image. To illustrate, the depth pixels 420 in FIG. 4B may correspond to the third set and are representative of the depths for the non-content region 340 in FIG. 3B. In some cases, the depth values in the third set are representative of the far plane and are initially set to a default depth value. Notably, this default depth value may be a maximum depth that is supported by the depth buffer.

There is then an act (act 815) of identifying essential depth discontinuities and non-essential depth discontinuities in the depth buffer. As described earlier, the essential depth discontinuities are depth discontinuities located within the depth buffer at areas corresponding to the overlap region of the color image (as well as any other overlap regions between multiple holograms in the color image). The non-essential depth discontinuities are depth discontinuities located within the depth buffer at areas corresponding to borders between the non-content region (i.e. the far plane) and the first content region or the second content region. FIG. 4C illustrates a few examples of both essential and non-essential depth discontinuities.

In some embodiments, a machine learning algorithm may be trained to distinguish essential from non-essential discontinuities. As used herein, reference to "machine learning" may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

It should be noted that depth discontinuities, including the non-essential depth discontinuities and the essential depth discontinuities, require relatively higher amounts of bandwidth during a subsequent encoding process into a depth buffer stream as compared to continuous depth regions in the depth buffer. Eliminating the non-essential depth discontinuities results in a lower amount of bandwidth being used during the later encoding process as compared to not eliminating the non-essential depth discontinuities used during encoding. As a consequence, it is desirable to eliminate depth discontinuities that are non-essential while preserving the essential discontinuities (e.g., to preserve hologram integrity, feel, and other visual aesthetics).

Accordingly, while preserving the essential depth discontinuities (e.g., by making no modifications to the depth values forming the essential discontinuities and making no modifications to depth values of content regions), method 800 then includes an act (act 820) of modifying a selected set of depth values (e.g., the third set) in the depth buffer to eliminate the non-essential depth discontinuities while also preventing new non-essential depth discontinuities from being included in the final form of the depth buffer. Such modifications may occur in the manners described earlier. In effect, this modification causes all of the depth values having a far plane depth value (i.e. the "third" set of depth values) as well as depth values for transparent objects to be modified to have new values. The new values are selected to satisfy the two criteria listed earlier. As a consequence, this modification or dilation process causes all of the previous far plane depth values to now have new values, where the new values are selected to be maximally smooth and continuous relative to their neighboring content depth values. Such operations effectively eliminate the borders that were previously present between content and non-content regions.

Additionally, image content without an associated depth value, such as alpha-blended or other transparent content, may be endowed or assigned with an approximate depth value that improves positional correction over using the incorrect far-plane depth value or discarding those regions. As such, the depth values for both non-content regions and alpha-blended or transparent content may be modified in the manner described above to eliminate non-essential discontinuities.

In some embodiments, modifying the third set of depth values in the depth buffer to eliminate the non-essential discontinuities is performed via a number of operations. For instance, a mask may be generated, where the mask distinguishes, relative to the depth buffer, the non-content region from content regions, including the first content region and the second content region. Based on the mask, the third set of depth values can then be modified in a manner to satisfy the following modification criteria: (1) the modified third set of depth values vary continuously relative to either one of the first set of depth values or the second set of depth values; and (2) the modified third set of depth values are maximally smooth, as described above.

As a consequence of modifying the third set of depth values, all of the third set of depth values (i.e. those values previously having the default or far plane value) are now assigned new depth values. Additionally, the modification process is performed by replacing the third set of depth values with new values. In some cases, these new values correspond to or are derived from the first set of depth values and/or the second set of depth values. For instance, the new values may be derived or computed from averages of the first or second set of depth values.

Additionally, the modification process is performed by smoothing the new values, or rather selecting new values that satisfy a smoothness criterion, to prevent new non-essential discontinuities from forming in the areas that were already modified. In particular, smoothing a particular new value of a particular depth pixel (or in other words, a depth value for a corresponding pixel located in the color image) in the depth buffer may be performed by computing an average of depth values for one or more depth pixels adjacent to the particular depth pixel and then assigning the average as the particular new value. With regard to the adjacent or abutting requirement, depth values corresponding to content regions may be selected, where those specific content regions are adjacent to the non-content region.

By way of example and with reference to the set of pixels 660 in FIG. 6C, for the top right most "50" non-content depth value, the "50" value is shown as being adjacent to three "5" content depth values. On the other hand, the "50" non-content depth value immediately to the left of the previous "50" value is adjacent to only a single "5" content depth value. In any event, all or a selected number of the adjacent content depth values may be used when computing the average.

Eliminating the non-essential depth discontinuities results in reductions to a number of regions in the depth buffer having a threshold level (e.g., threshold 455 from FIG. 4B) of depth complexity (e.g., depth complexity 450). A reduced depth complexity allows the encoding and compression processes to be performed more efficiently, thereby allowing the computing resources to be diverted to other computing operations and requirements.

Method 800 then includes an act (act 825) of encoding the color image into a color image video stream (e.g., color image video stream 145 from FIG. 1) and encoding the modified depth buffer into a depth buffer stream (e.g., depth buffer stream 150). Method 800 then includes an act (act 830) of transmitting the color image video stream and the depth buffer stream to a remotely located HMD, such as HMD 105 from FIG. 1. The depth buffer is transmitted in a different stream than the color image because different compression techniques may be applied to the color image, which has multiple color attributes, as compared to the depth buffer, which effectively has a monochrome value. Accordingly, the embodiments encode the modified depth buffer in a depth buffer stream to facilitate reduced bandwidth usage during the encoding process by reducing an amount of data (e.g., discontinuities), via elimination of the non-essential depth discontinuities, that is encoded and then transmit the depth buffer stream to a remotely located device.

Reprojection Operations

Figure 9:
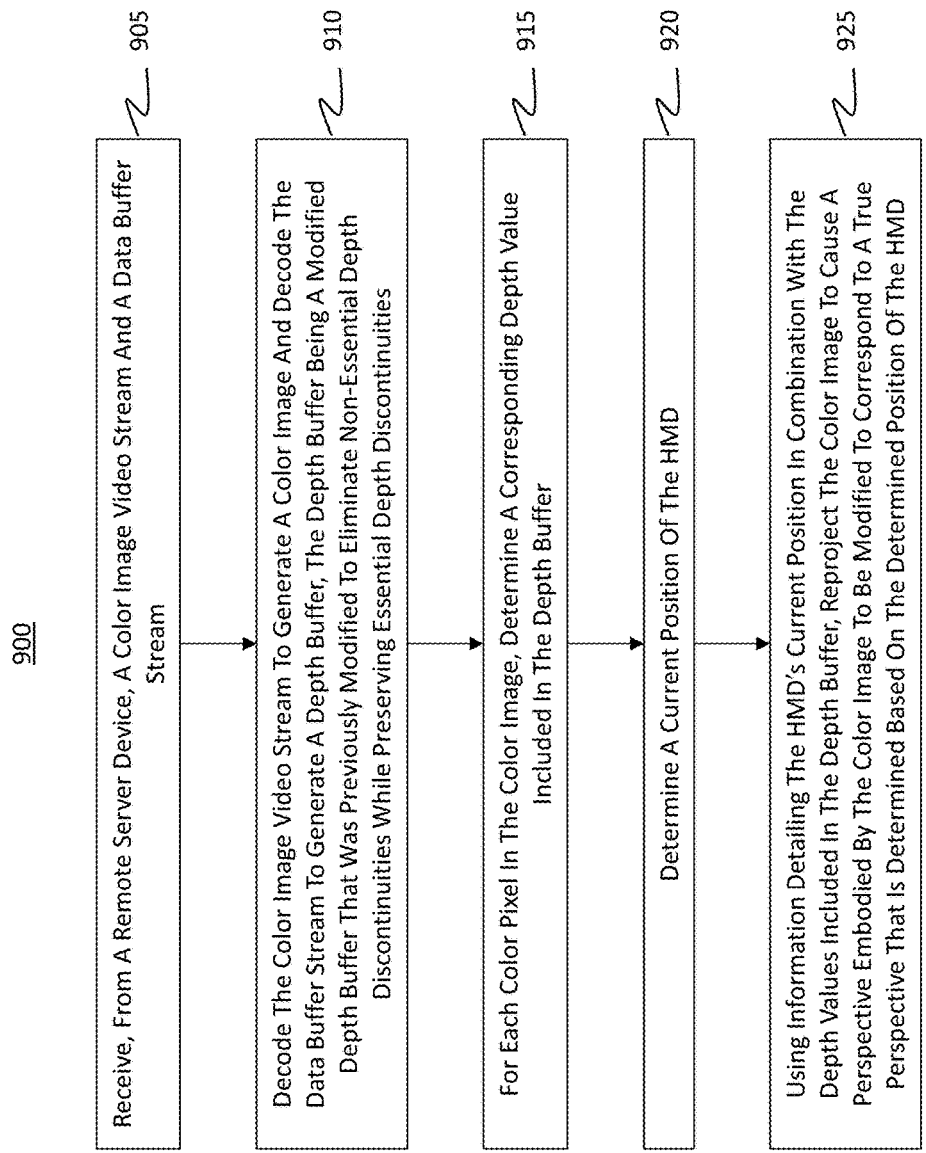
FIG. 9 illustrates a flowchart of an example method in which an HMD receives a depth buffer that was previously modified to remove non-essential depth discontinuities and then performs color image reprojections using this modified depth buffer to ensure the color image embodied a perspective representative of the HMD's actual position and pose.

Method 800 of FIG. 8 described operations that may be performed by the remote server 120 illustrated in FIG. 1. Method 900 of FIG. 9, on the other hand, describes operations that may be performed by the HMD 105 of FIG. 1. Accordingly, attention will now be directed to method 900, which is performed by the HMD 105 (which may have a display for displaying holograms and color images).

Initially, method 900 includes an act (act 905) of the HMD receiving, from a remote server device, a color image video stream and a depth buffer stream, as shown in FIG. 1. Method 900 then includes an act (act 910) of the HMD decoding the color image video stream to generate a color image and decoding the depth buffer stream to generate a depth buffer.

This depth buffer is a modified depth buffer that was previously modified to eliminate non-essential depth discontinuities while preserving essential depth discontinuities. By way of additional clarification, essential depth discontinuities are depth discontinuities located at regions in the depth buffer corresponding to areas in the color image where a second hologram overlaps a first hologram, and non-essential depth discontinuities are depth discontinuities located at regions in the depth buffer corresponding to areas in the color image where either the first hologram or the second hologram borders a non-content far plane, as illustrated in FIG. 4C.

For each color pixel in the color image, the method 900 includes an act (act 915) of determining a corresponding depth value included in the depth buffer. For instance, pixel 325A of FIG. 3B is associated or assigned the pixel depth value 415A of FIG. 4B. This determination may be performed by matching coordinates for pixels and depth values.

Method 900 also includes an act (act 920) of determining a current position of the HMD. One will appreciate how act 920 may actually be performed at any time subsequent (or perhaps even immediately prior or a threshold amount of time prior) to when the color image stream is received. Determining the current position of the HMD may be performed using one or more of an inertial measurement unit (IMU) or head-tracking cameras.

Because the color image initially has a perspective that is generated based on a predicted position of the HMD and because the HMD may have moved since that initial prediction was performed, it is beneficial to reproject the color image to provide it with an updated perspective corresponding to the actual position of the HMD. As such, there is an act (act 925) of using information detailing the HMD's current position in combination with the depth values included in the depth buffer to reproject the color image. This reprojection process causes a perspective embodied by the color image to be modified to correspond to a true perspective that is determined based on the determined position of the HMD.

Accordingly, the HMD effectively receives two separate images (e.g., the color image and the depth buffer) and then, for each color pixel in the color image, the HMD reads the corresponding depth value (i.e. the depth value located at the same position or having the same coordinates as the pixel in the color image) and assigns that depth value to the pixel. The HMD may then apply a correction step (e.g., by performing the reprojection) and display the color pixel at an updated position on the HMD, where the updated position corresponds to the user's or HMD's new/actual position.

Accordingly, the disclosed embodiments focus on techniques for modifying a depth buffer to eliminate non-essential discontinuities. Such modifications result in the following improvements: less bandwidth is required to encode the depth buffer in a compressed format for sending it to a client device; and reprojection cost is reduced while maintaining depth quality due to selective reduction of regions of high depth complexity. The disclosed embodiments intelligently modify far plane depth values, which correspond to non-content regions in a color image, so that the resulting depth values have values that enable the subsequent streams to be more easily compressed and the depth buffer to be more easily reprojected on the HMD.

Example Computer/Computer Systems

Figure 10:
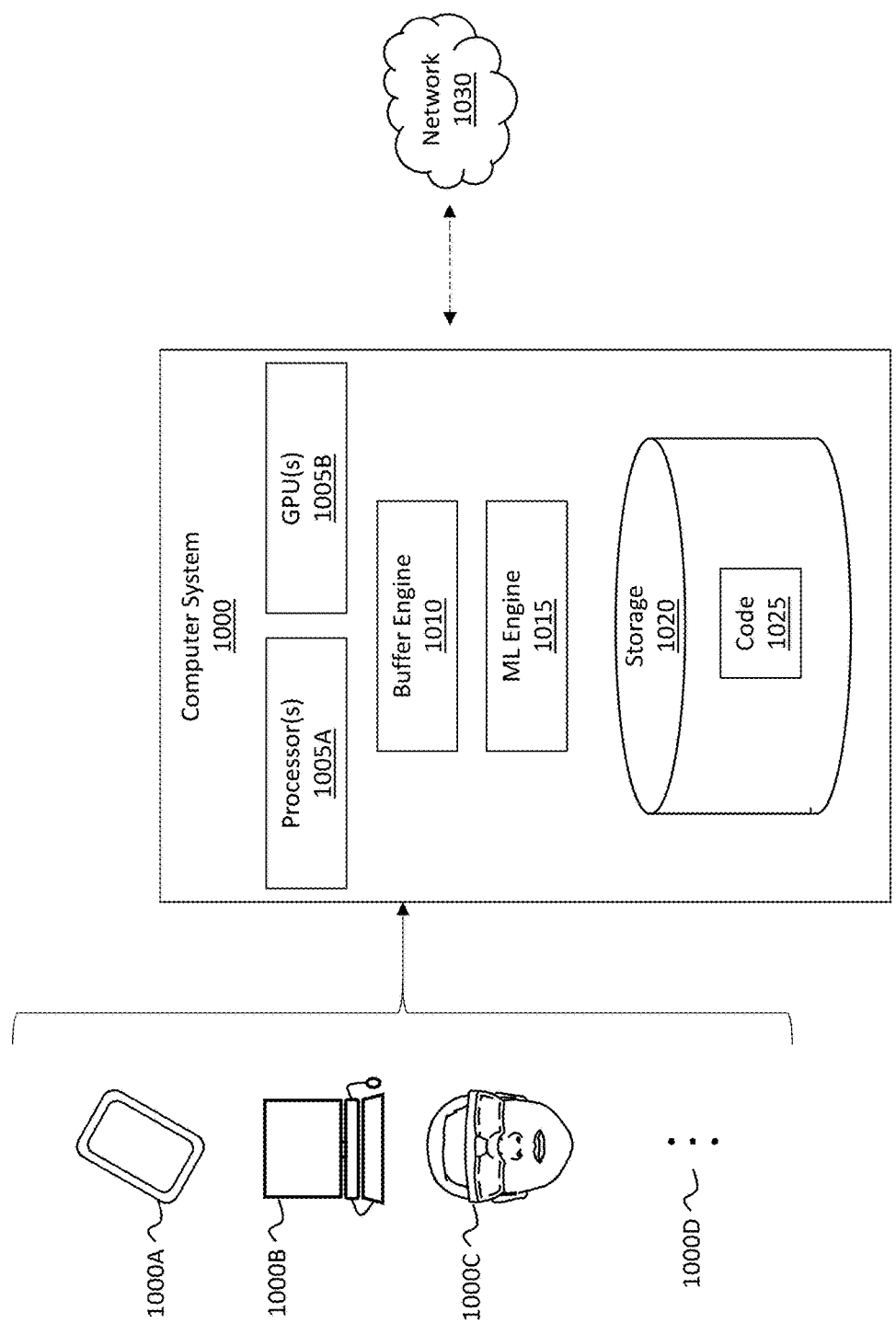
FIG. 10 illustrates an example computer system configured to perform any of the disclosed operations.

Attention will now be directed to FIG. 10 which illustrates an example computer system 1000 that may include and/or be used to perform any of the operations described herein. Computer system 1000 may take various different forms. For example, computer system 1000 may be embodied as a tablet 1000A, a desktop or a laptop 1000B, a wearable device (e.g., HMD 1000C), a mobile device, or a standalone device, or a server, such as those described throughout this disclosure. The ellipsis 1000D represents how the computer system 1000 may take on other forms as well, without limit. Computer system 1000 may also be a distributed system that includes one or more connected computing components/devices that are in communication with computer system 1000. The HMD 105 of FIG. 1 may be an example implementation of the computer system 1000, and the remote server 120 may also be an example implementation of the computer system 1000.

In its most basic configuration, computer system 1000 includes various different components. FIG. 10 shows that computer system 1000 includes one or more processor(s) 1005A (aka a "hardware processing unit"), GPU(s) 1005B, a buffer engine 1010, a machine learning ML engine 1015, and storage 1020.

Regarding the processor(s) 1005A and the GPU(s) 1005B, it will be appreciated that the functionality described herein can be performed, at least in part, by one or more hardware logic components (e.g., the processor(s) 1005A or GPU(s) 1005B). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical/Graphics Processing Units ("GPU"), or any other type of programmable hardware.

The buffer engine 1010 may be implemented to perform any of the operations with regard to generating and modifying the depth buffer. Additionally, or alternatively, the processor(s) 1005A or the GPU(s) 1005B may be involved as well. The buffer engine 1010 or even the machine learning ML engine 1015, which may include the machine learning features described earlier, may be implemented as a specific processing unit (e.g., a dedicated processing unit as described earlier) configured to perform one or more specialized operations for the computer system 1000. As used herein, the terms "executable module," "executable component," "component," "module," or "engine" can refer to hardware processing units or to software objects, routines, or methods that may be executed on computer system 1000. The different components, modules, engines, and services described herein may be implemented as objects or processors that execute on computer system 1000 (e.g. as separate threads).

Storage 1020 may be physical system memory, which may be volatile, non-volatile, or some combination of the two. The term "memory" may also be used herein to refer to non-volatile mass storage such as physical storage media. If computer system 1000 is distributed, the processing, memory, and/or storage capability may be distributed as well.

Storage 1020 is shown as including executable instructions (i.e. code 1025). The executable instructions represent instructions that are executable by the processor(s) 1005A (or perhaps even the GPU(s) 1005B or the buffer engine 1010) of computer system 1000 to perform the disclosed operations, such as those described in the various methods.

The disclosed embodiments may comprise or utilize a special-purpose or general-purpose computer including computer hardware, such as, for example, one or more processors (such as processor(s) 1005A) and system memory (such as storage 1020), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1000 may also be connected (via a wired or wireless connection) to external sensors (e.g., one or more remote cameras) or devices via a network 1030. For example, computer system 1000 can communicate with any number devices or cloud services to obtain or process data. In some cases, network 1030 may itself be a cloud network. Furthermore, computer system 1000 may also be connected through one or more wired or wireless networks 1030 to remote/separate computer systems(s) that are configured to perform any of the processing described with regard to computer system 1000.

A "network," like network 1030, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1000 will include one or more communication channels that are used to communicate with the network 1030.

Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more processors or graphics processing units (GPUs); and
one or more computer-readable hardware storage devices that store computer-executable instructions that are executable by the one or more processors or GPUs to cause the computer system to at least:
generate a color image comprising a first content region, a second content region, and an overlap region where the second content region overlaps the first content region;
generate, for the color image, a depth buffer comprising a corresponding depth value for each pixel in the color image, wherein the depth buffer identifies:
a first set of depth values for the first content region,
a second set of depth values for the second content region, and
a third set of depth values for a non-content region included in the color image;
identify essential depth discontinuities and non-essential depth discontinuities in the depth buffer, the essential depth discontinuities being depth discontinuities located within the depth buffer at areas corresponding to the overlap region of the color image, the non-essential depth discontinuities being depth discontinuities located within the depth buffer at areas corresponding to borders between the non-content region and the first content region or the second content region;
while preserving the essential depth discontinuities, modify the third set of depth values in the depth buffer to eliminate the non-essential depth discontinuities; and
encode the modified depth buffer in a depth buffer stream to facilitate reduced bandwidth usage during said encoding by reducing an amount of data, via elimination of the non-essential depth discontinuities, that is encoded and transmit said depth buffer stream to a remotely located device.

2. The computer system of claim 1, wherein modifying the third set of depth values in the depth buffer to eliminate the non-essential discontinuities is performed by:
generating a mask that distinguishes, relative to the depth buffer, the non-content region from content regions, including the first content region and the second content region;
based on the mask, modifying the third set of depth values in a manner to satisfy the following modification criteria:
the modified third set of depth values vary continuously relative to either one of the first set of depth values or the second set of depth values; and
the modified third set of depth values are maximally smooth.

3. The computer system of claim 1, wherein the third set of depth values are initially set to a default depth value, and wherein the default depth value is a maximum depth that is supported by the depth buffer.

4. The computer system of claim 3, wherein, as a result of modifying the third set of depth values, all of the third set of depth values previously having the default depth value are assigned new depth values.

5. The computer system of claim 1, wherein modifying the third set of depth values in the depth buffer to eliminate the non-essential discontinuities is performed by replacing the third set of depth values with new values corresponding to the first set of depth values and the second set of depth values and smoothing the new values to prevent new non-essential discontinuities from forming.

6. The computer system of claim 5, wherein the smoothing of a particular new value of a particular depth pixel in the depth buffer is performed by computing an average of depth values for one or more depth pixels adjacent to the particular depth pixel and then assigning the average as the particular new value.

7. The computer system of claim 1, wherein execution of the computer-executable instructions further causes the computer system to:
encode the color image into a color image video stream and encode the modified depth buffer into a depth buffer stream.

8. The computer system of claim 7, wherein execution of the computer-executable instructions further causes the computer system to:
transmit, to a remotely located head-mounted device (HMD), the color image video stream and the depth buffer stream.

9. The computer system of claim 8, wherein the color image has a perspective that is generated based on a predicted position of the remotely located HMD.

10. The computer system of claim 1, wherein the computer system is a server operating in a cloud environment.

11. A head-mounted device (HMD) comprising:
a display;
one or more processors; and
one or more computer-readable hardware storage devices storing executable instructions that are executable by the one or more processors to cause the HMD to at least:
receive, from a remote server device, a color image video stream and a depth buffer stream;
decode the color image video stream to generate a color image and decode the depth buffer stream to generate a depth buffer, wherein the depth buffer is a modified depth buffer that was previously modified to eliminate non-essential depth discontinuities while preserving essential depth discontinuities, wherein essential depth discontinuities are depth discontinuities located at regions in the depth buffer corresponding to areas in the color image where a second hologram overlaps a first hologram, and wherein non-essential depth discontinuities are depth discontinuities located at regions in the depth buffer corresponding to areas in the color image where either the first hologram or the second hologram borders a non-content far plane;

for each color pixel in the color image, determine a corresponding depth value included in the depth buffer;

determine a current position of the HMD; and using information detailing the HMD's current position in combination with the depth values included in the depth buffer, reproject the color image to cause a perspective embodied by the color image to be modified to correspond to a true perspective that is determined based on the determined position of the HMD.

12. The HMD of claim 11, wherein determining the current position of the HMD is performed using one or more of an inertial measurement unit (IMU) or head-tracking cameras.

13. The HMD of claim 11, wherein the color image initially has a perspective that is generated based on a predicted position of the HMD.

14. The HMD of claim 11, wherein eliminating the non-essential depth discontinuities results in reductions to a number of regions in the depth buffer having a threshold level of depth complexity.

15. A method for modifying a depth buffer to eliminate non-essential depth discontinuities in order to use reduced bandwidth for encoding the depth buffer, said method comprising:

generating a color image comprising a first content region, a second content region, and an overlap region where the second content region overlaps the first content region;

generating, for the color image, a depth buffer comprising a corresponding depth value for each pixel in the color image, wherein the depth buffer identifies:

a first set of depth values for the first content region, a second set of depth values for the second content region, and a third set of depth values for a non-content region included in the color image;

identifying essential depth discontinuities and non-essential depth discontinuities in the depth buffer, the essential depth discontinuities being depth discontinuities located within the depth buffer at areas corresponding to the overlap region of the color image, the non-essential depth discontinuities being depth discontinuities located within the depth buffer at areas corresponding to borders between the non-content region and the first content region or the second content region;

while preserving the essential depth discontinuities, modifying the third set of depth values in the depth buffer to eliminate the non-essential depth discontinuities;

encoding the color image into a color image video stream and encoding the modified depth buffer into a depth buffer stream, wherein using the modified depth buffer facilitates reduced bandwidth usage during said encoding into the depth buffer stream by reducing an amount of data, via elimination of the non-essential depth discontinuities, that is encoded; and transmitting, to a remotely located head-mounted device (HMD), the color image video stream and the depth buffer stream.

16. The method of claim 15, wherein depth discontinuities, including the non-essential depth discontinuities and the essential depth discontinuities, require relatively higher amounts of bandwidth during encoding in the depth buffer stream as compared to continuous depth regions in the depth buffer, and wherein eliminating the non-essential depth discontinuities results in a lower amount of bandwidth being used during encoding as compared to not eliminating the non-essential depth discontinuities used during encoding.

17. The method of claim 15, wherein the method further includes using a mask to distinguish between content regions in the color image and non-content regions in the color image.

18. The method of claim 15, wherein the third set of depth values are modified to satisfy a continuity criterion and a maximally smooth criterion.

19. The method of claim 15, wherein the third set of depth values correspond to a far plane.

20. The method of claim 15, wherein eliminating the non-essential depth discontinuities results in reductions to a number of regions in the depth buffer having a threshold level of depth complexity.

* * * * *